(12) United States Patent
Harada et al.

(10) Patent No.: US 7,233,453 B2
(45) Date of Patent: Jun. 19, 2007

(54) SERVO TRACK WRITING DEVICE AND METHOD THEREOF

(75) Inventors: Tohru Harada, Kawasaki (JP); Taizan Kobayashi, Kawasaki (JP); Toshinori Kasuga, Kawasaki (JP); Yukio Ozaki, Kawasaki (JP); Eiji Takada, Kawasaki (JP); Hirofumi Ohsawa, Kawasaki (JP); Masanori Fukushi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 152 days.

(21) Appl. No.: 10/641,300

(22) Filed: Aug. 15, 2003

(65) Prior Publication Data

US 2004/0105184 A1 Jun. 3, 2004

(30) Foreign Application Priority Data

Aug. 30, 2002 (JP) .............................. 2002-252937

(51) Int. Cl.
*G11B 5/09* (2006.01)
*G11B 21/02* (2006.01)

(52) U.S. Cl. ......................................... 360/51; 360/75
(58) Field of Classification Search ..................... None
See application file for complete search history.

(56) References Cited

U.S. PATENT DOCUMENTS

| 6,057,976 A * | 5/2000 | Ishida et al. .............. 360/77.03 |
| 6,266,298 B1 * | 7/2001 | Tsai .......................... 369/13.24 |
| 6,356,401 B1 * | 3/2002 | Bates et al. ................... 360/51 |
| 6,414,807 B2 * | 7/2002 | Bates et al. ................... 360/51 |
| 6,522,604 B2 * | 2/2003 | Tsai .......................... 369/13.24 |
| 6,587,293 B1 * | 7/2003 | Ding et al. .................... 360/51 |
| 6,751,044 B1 * | 6/2004 | Meeks et al. ............ 360/77.03 |
| 2002/0012293 A1 | 1/2002 | Tsai |
| 2004/0070432 A1 * | 4/2004 | Chauhan ..................... 327/156 |

FOREIGN PATENT DOCUMENTS

| JP | 62-234280 | * 10/1987 |
| JP | 5-303852 | 11/1993 |
| JP | 2002-208241 | * 7/2002 |

OTHER PUBLICATIONS

Annex to the European Search Report.

* cited by examiner

*Primary Examiner*—Andrea Wellington
*Assistant Examiner*—Varsha A. Kapadia
(74) *Attorney, Agent, or Firm*—Armstrong, Kratz, Quintos, Hanson & Brooks, LLP

(57) ABSTRACT

A vibration extraction processing unit extracts a deflection component synchronous with a rotation from a clock signal of a non-contact sensor so as to correct a clock jitter. A clock generating unit generates a clock signal of any format frequency preliminarily set up according to the clock signal from the vibration extraction processing unit. A sector correction processing unit measures an error due to the frequency deflection so as to correct the writing start position for the format pattern signal of each sector containing a servo frame signal stored in a memory according to the measured error. Writing processing units read out the corrected format pattern signal from the memory according to a synchronous signal corresponding to a single turn of a disc and a format frequency clock signal and then writes into a disc medium face.

42 Claims, 29 Drawing Sheets

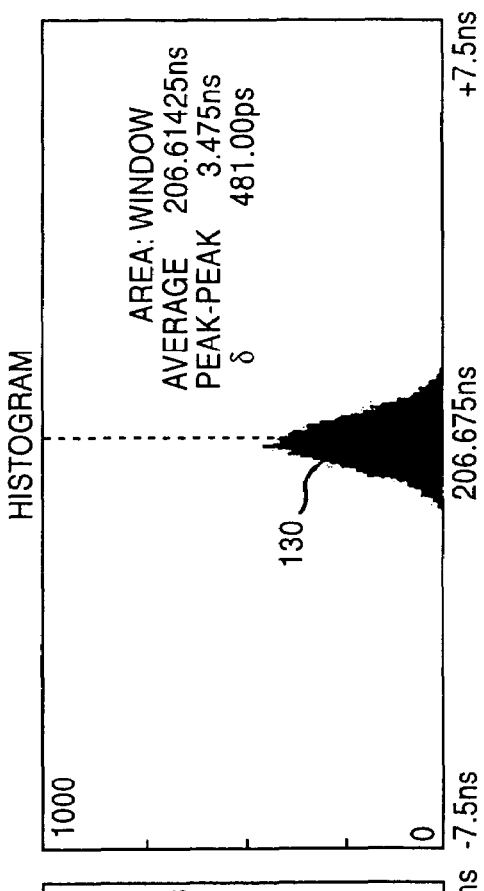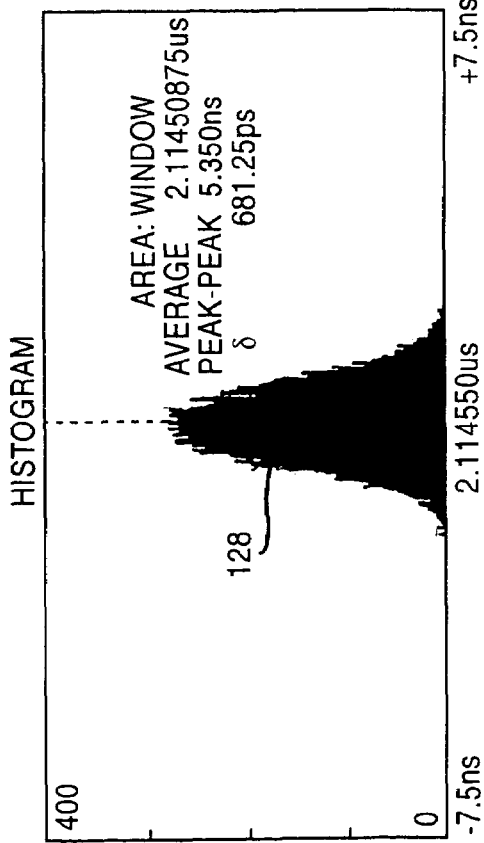

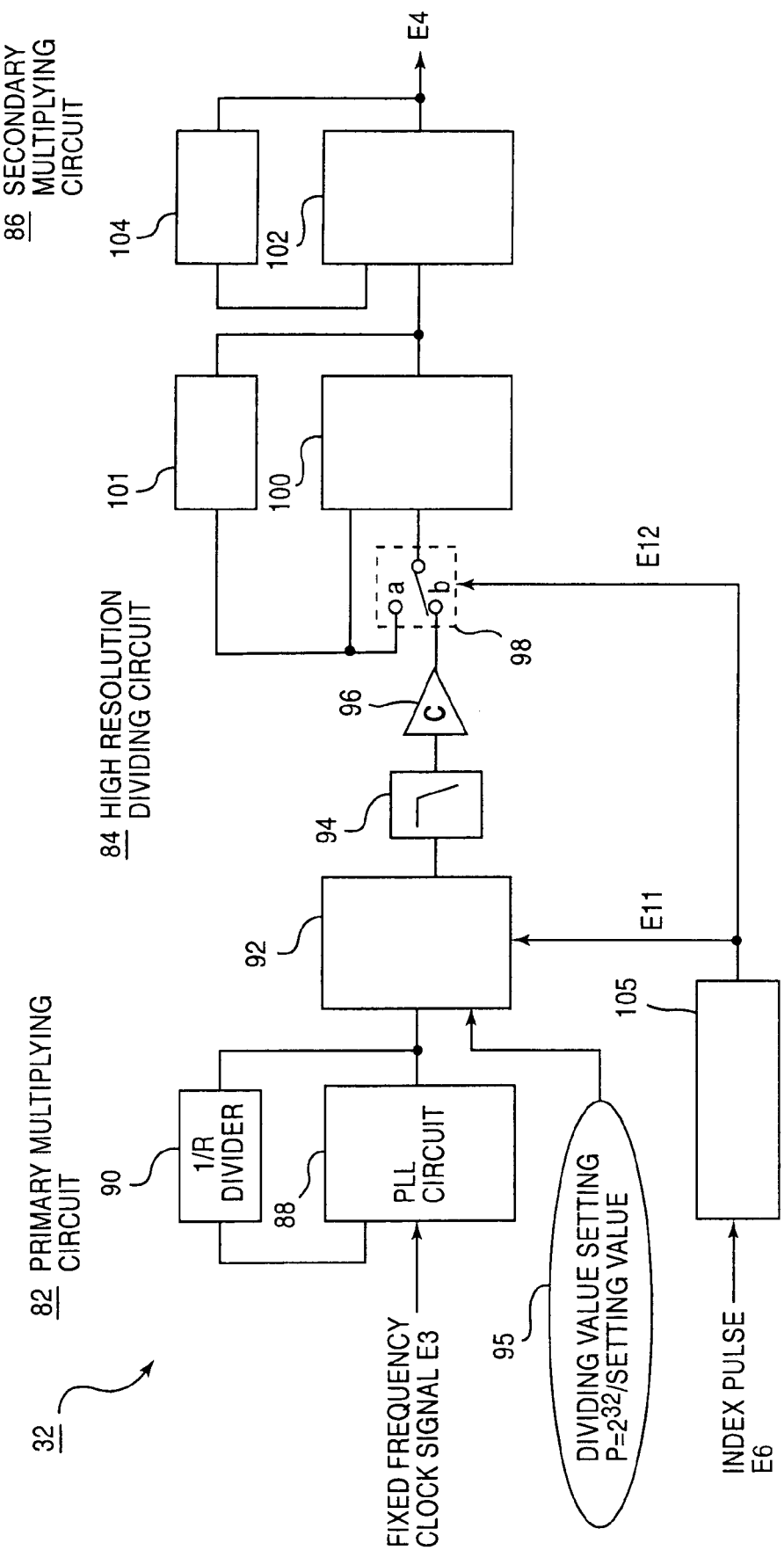

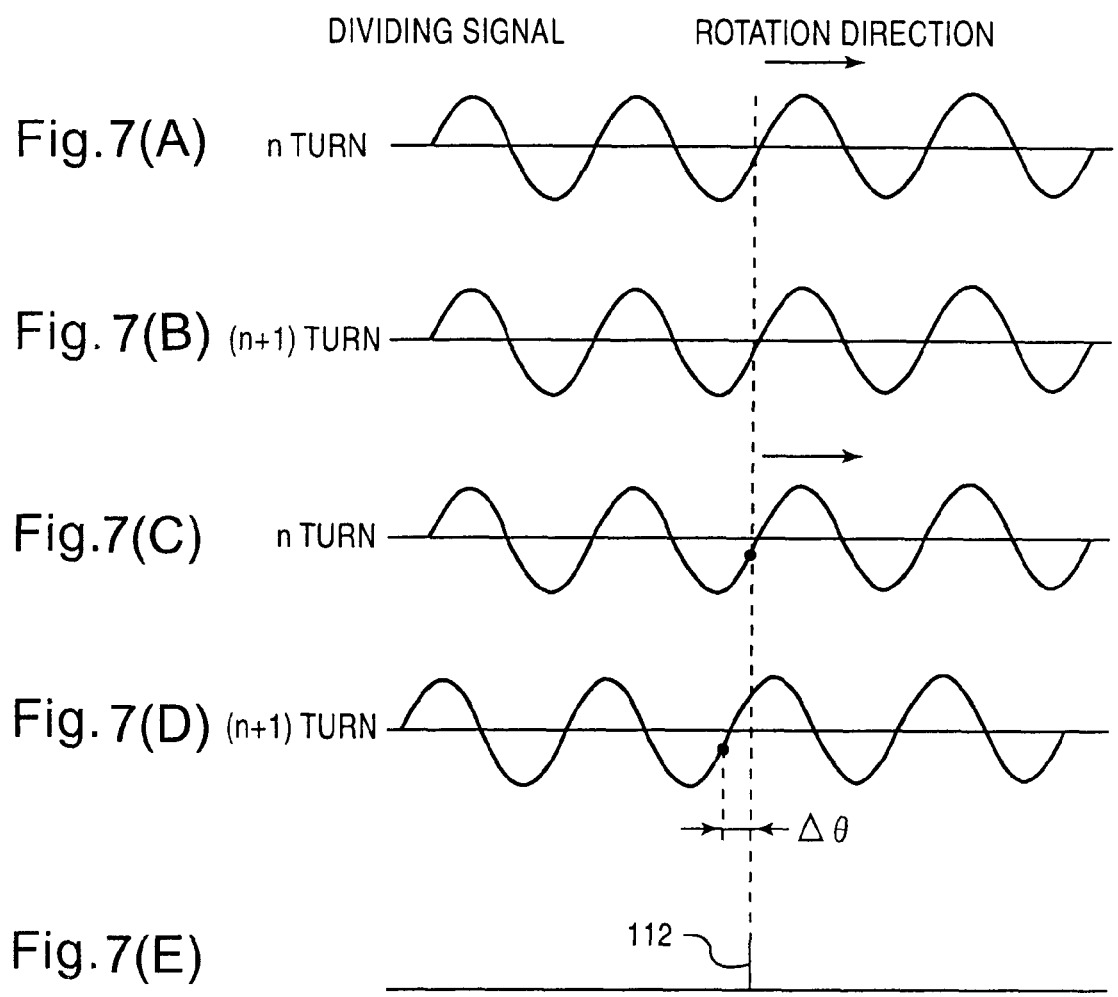

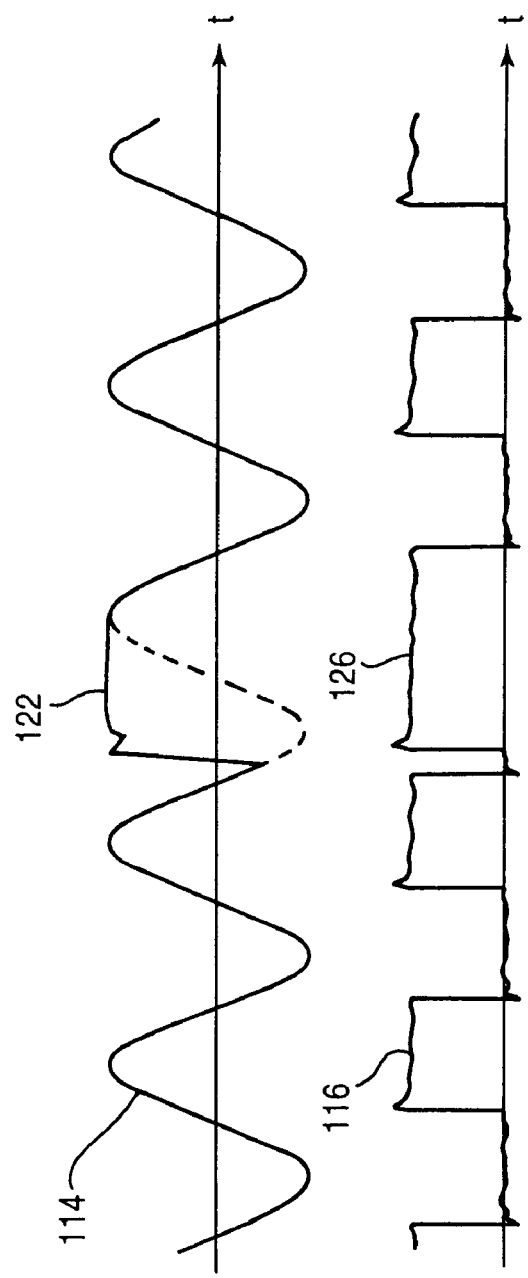

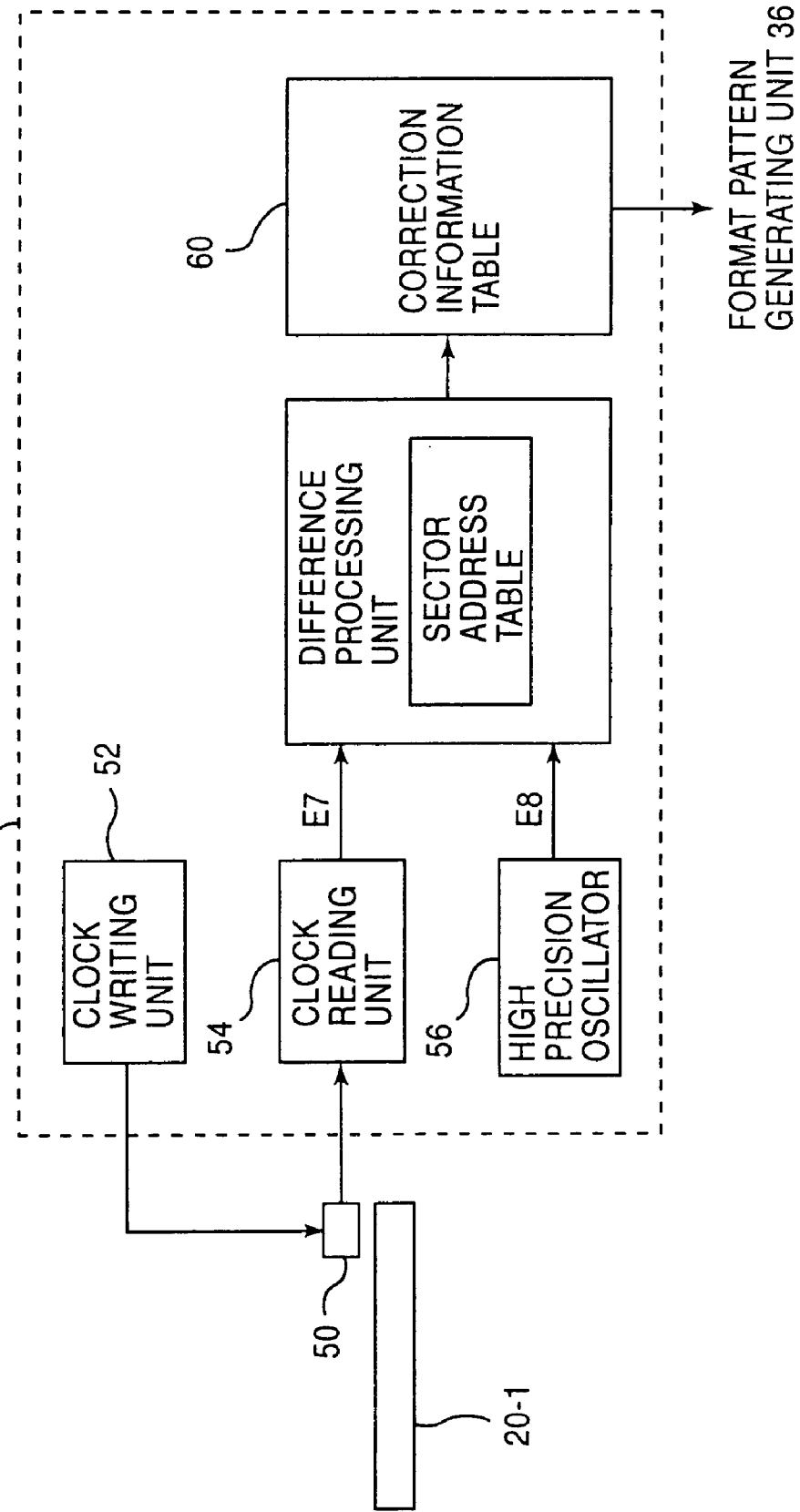

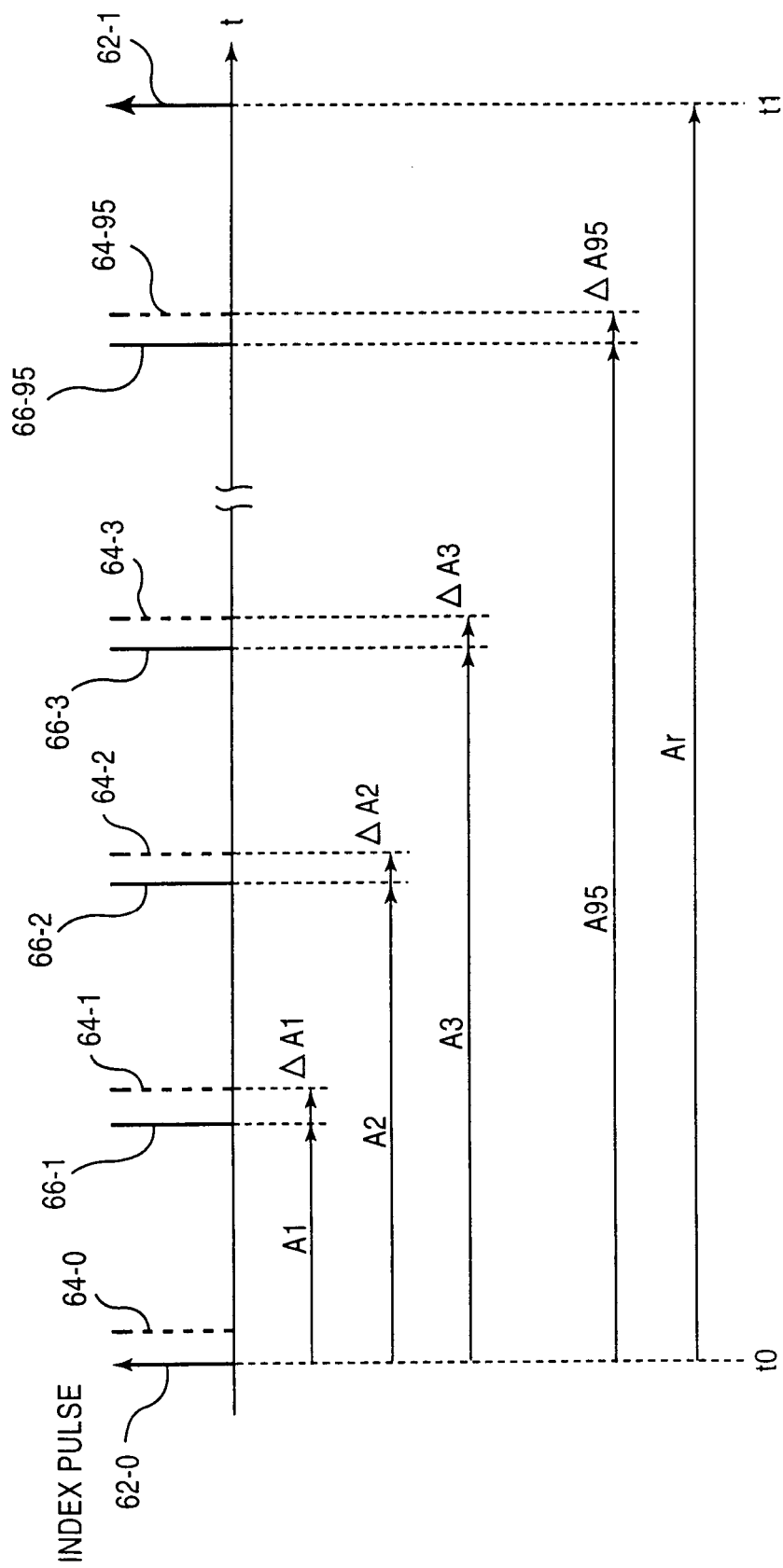

Fig.11

SECTOR ADDRESS TABLE
68

| SECTOR No. | WRITING SETUP ADDRESS |
|---|---|
| 0 | A0 |
| 1 | A1 |
| 2 | A2 |
| 3 | A3 |
| 4 | A4 |
| 5 | A5 |
| 6 | A6 |
| ... | ... |
| 94 | A94 |
| 95 | A95 |

CORRECTION INFORMATION TABLE
60

| SECTOR No. | CORRECTION ADDRESS No. |
|---|---|
| 0 | △A0 |
| 1 | △A1 |
| 2 | △A2 |
| 3 | △A3 |
| 4 | △A4 |
| 5 | △A5 |
| 6 | △A6 |
| 94 | △A94 |
| 95 | △A95 |

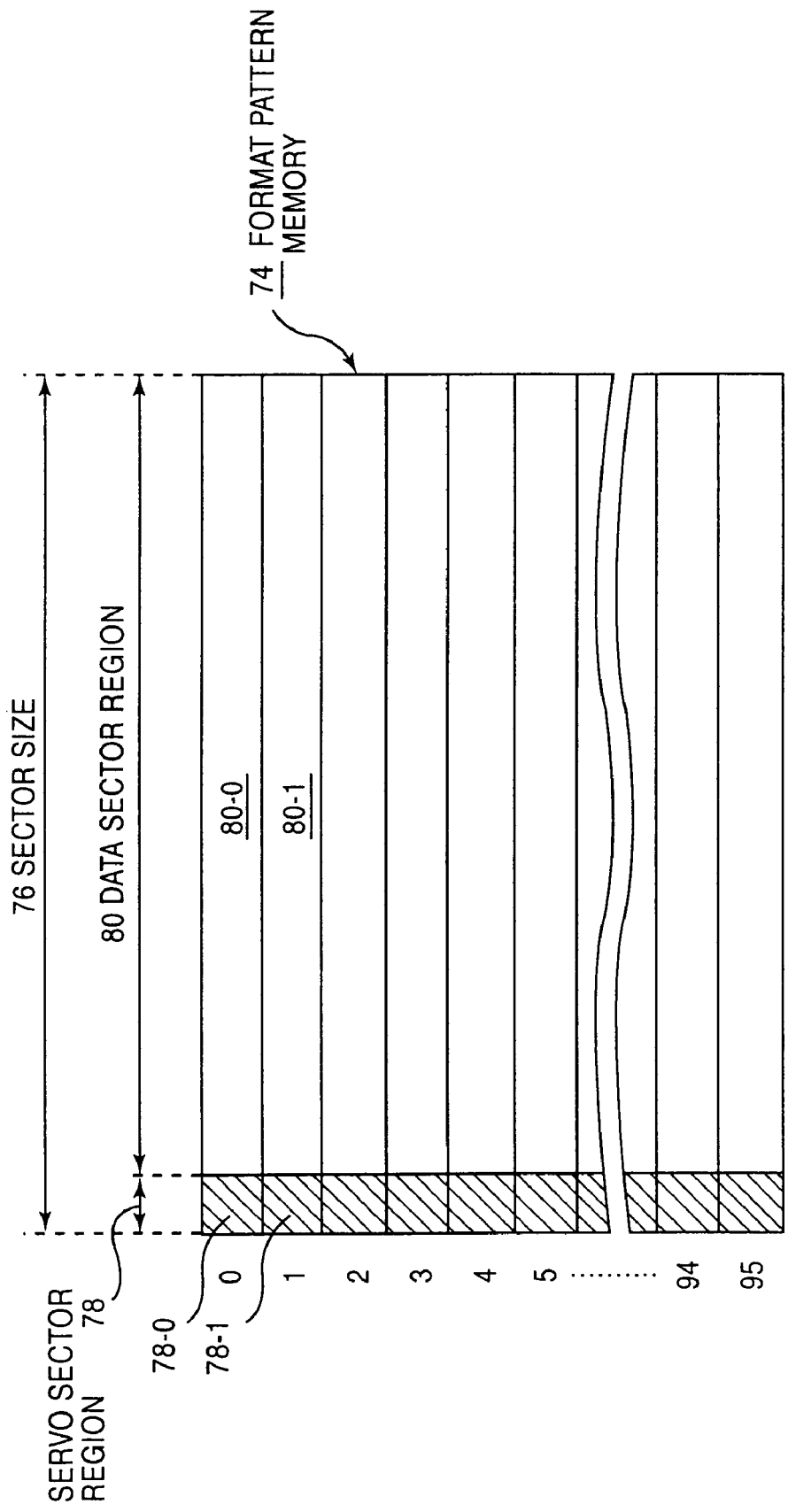

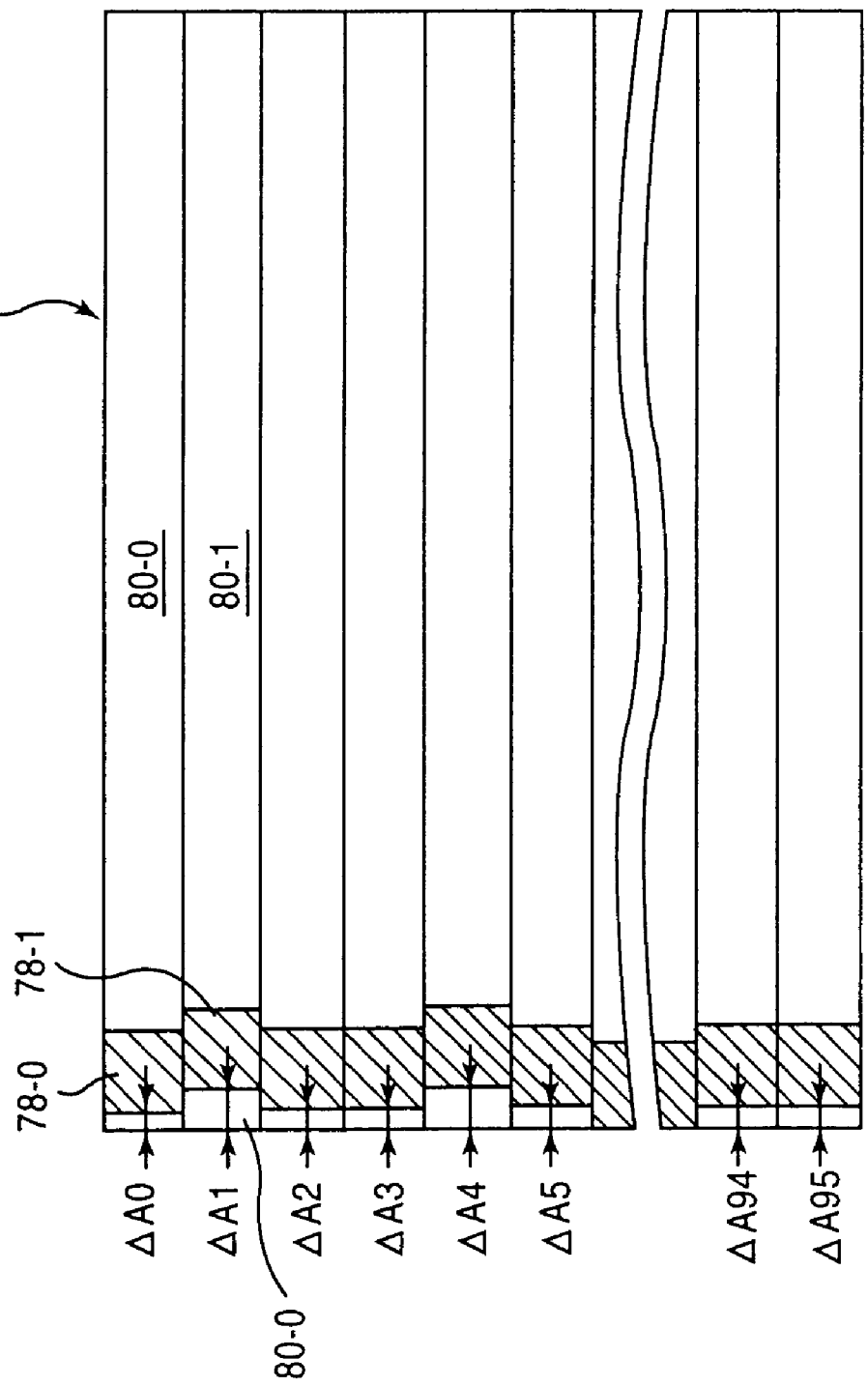

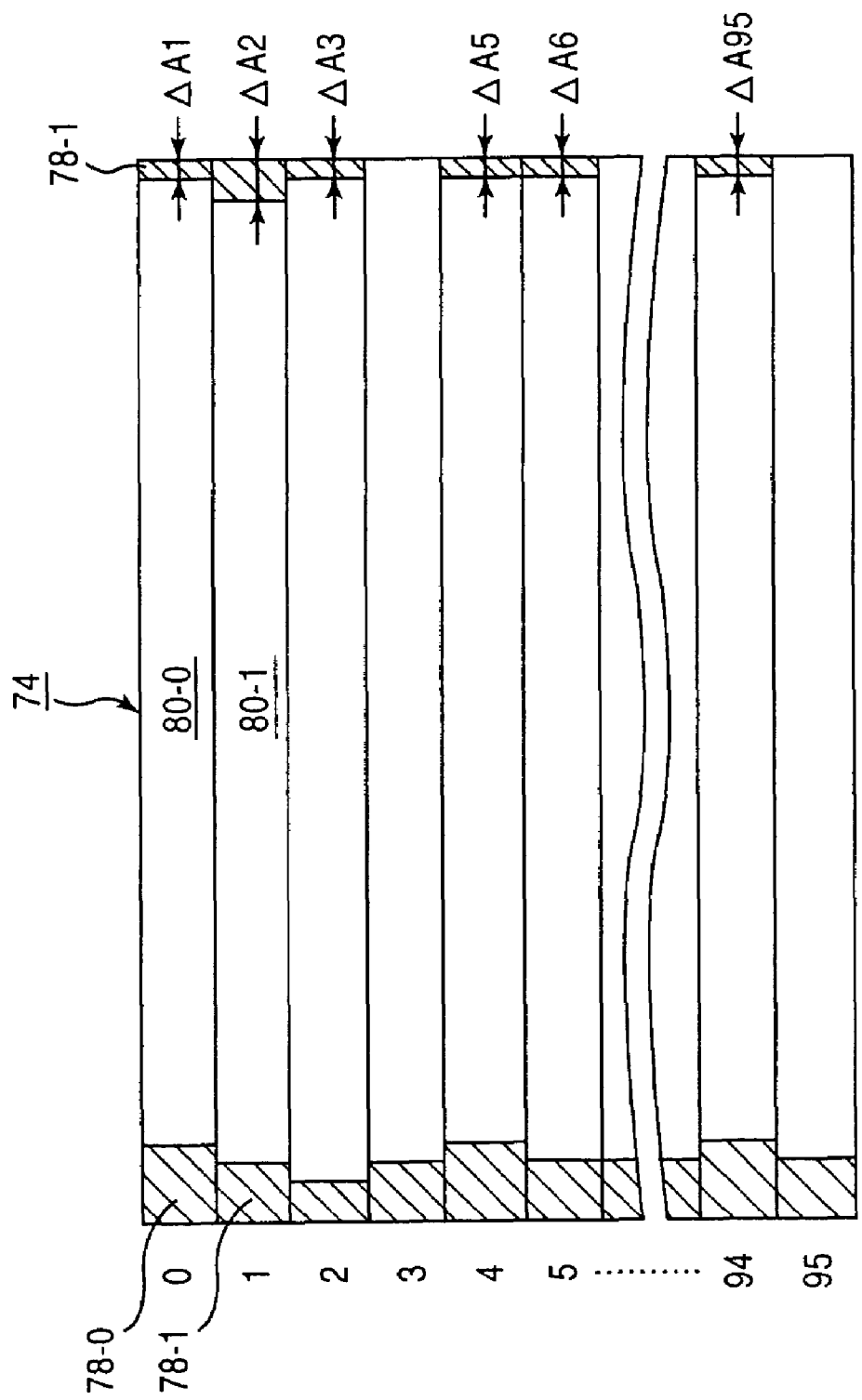

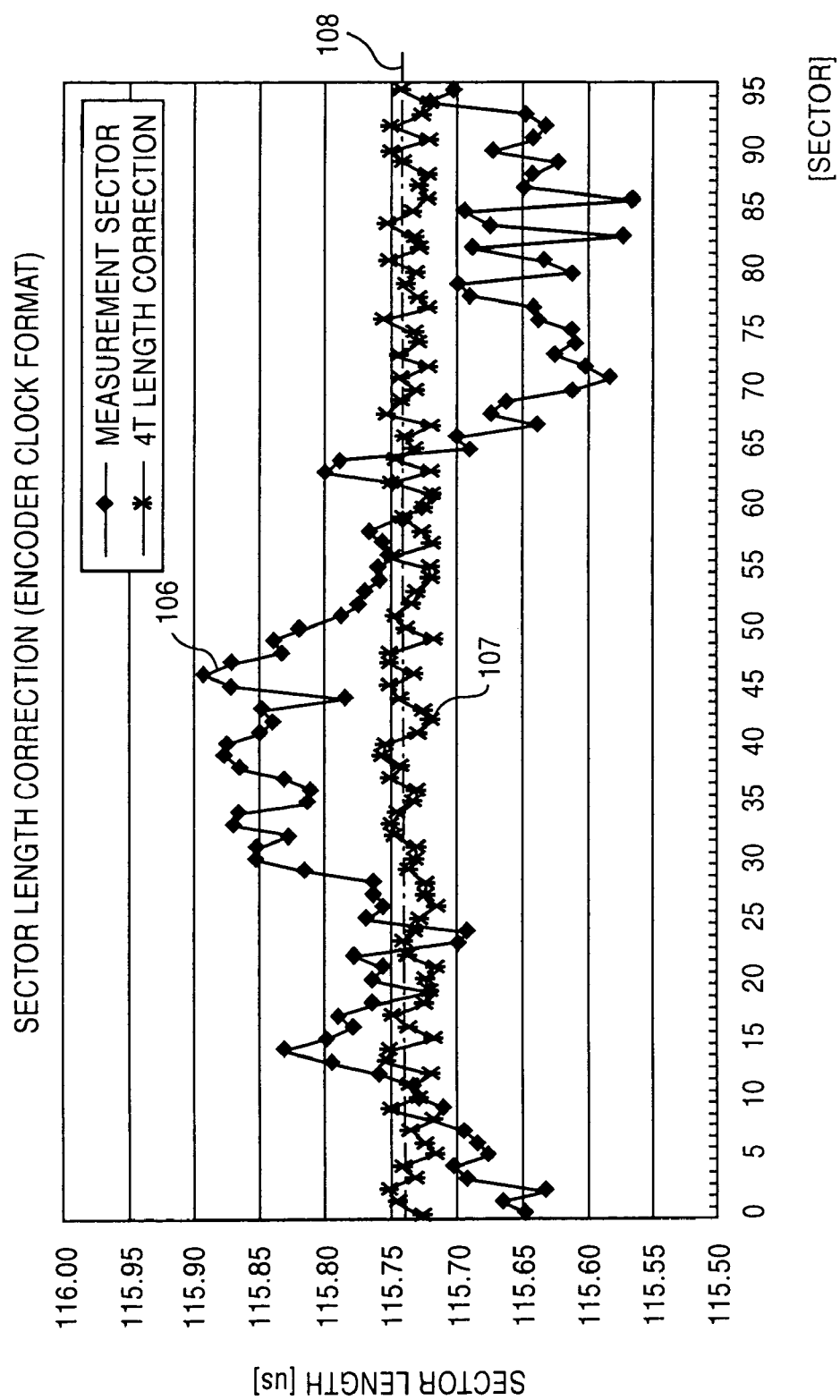

SERVO TRACK WRITING DEVICE AND METHOD THEREOF

BACKGROUND OF THE INVENTION

1. Field of the Invention

The present invention relates to a servo track writing device for recording a format pattern including a servo frame in a magnetic disc drive unit and a method thereof and more particularly to a servo track writing device for recording a format pattern including a servo frame by generating a clock signal from a disc scale by means of a non-contact sensor and a method thereof.

2. Description of the Related Arts

When a servo frame pattern is recorded into a magnetic disc of a hard disc drive using a device conventionally known as a servo track writer (STW) at the manufacturing stage, a reference clock is necessary for achieving synchronism between a write position in the circumferential direction on a disc medium plane and a write signal.

According to an ordinary method, the clock signal is written directly into the disc medium using a reference head which is a specialized magnetic head and then, the reference clock is generated by reading this signal for reference.

According to this method, an assembled disc enclosure case needs to have a hole for inserting the reference head and thus, a servo frame signal must be written in a clean room for dust protection.

Further, because the reference head needs to be often replaced because of its consumption, it has a problem of low production efficiency. To solve these problems, a device which generates a clock using a non-contact sensor is considered.

However, when a clock is generated using the non-contact sensor, the frequency of the reference clock is fixed by the revolution numbers of an encoder bonded to a disc face as a seal and the disc. Consequently, even if circuit processing for ordinary frequency conversion is carried out, nothing but a clock which is produced by multiplication by an integer or dividing by an integer of the reference clock can be obtained and therefore, there is such an inconvenience that an arbitrary clock frequency (format frequency) required for writing of the servo frame pattern cannot be set up freely.

Further, the clock itself changes due to unevenness of the density of the clock pattern formed on the encoder scale, a deflection of the rotation of a disc or the like. Further, when the disc enclosure is vibrated a clock jitter occurs. Consequently, physical sector starting positions on a disc face can deflect in the radius direction and therefore, there is such a problem that the time of each sector also deflects more largely as compared to a case where there is no rotation deflection or vibration.

SUMMARY OF THE INVENTION

The present invention intends to provide a servo track writing device which achieves high precision writing while suppressing the clock jitter and frequency deflection, which are generated when the clock is detected with the non-contact sensor, and a method thereof.

Device

The present invention provides a servo track writing device in which each track on a disc medium face is divided to a plurality of sectors and a format pattern signal including a servo frame signal is written into each sector.

The feature of the servo track writing device of the present invention comprises: at least two non-contact sensors 26 which detect a clock pattern formed on a disc rotated at a constant speed through non-contact and outputs a clock signal of a predetermined frequency; a clock generating unit 32 for generating a clock signal of arbitrary format frequency set up preliminarily based on a clock signal from the non-contact sensor 30; and a writing processing unit for writing a format pattern signal into each track on the disc medium face according to a synchronous signal of a turn of the disc and the clock signal of the format frequency.

Another feature of the servo track writing device is the inclusion of a vibration extraction processing unit 30 for correcting a clock jitter by extracting a vibration component synchronous with a rotation from the clock signal of the non-contact sensor.

Still another feature of the servo track writing device is the inclusion of a sector correction processing unit 34 which measures an error due to a frequency deflection synchronous with a rotation with respect to a preliminarily determined writing start position for each sector of the disc and corrects a writing start position of a format pattern signal for each sector including a servo frame signal stored in a memory according to the measured error.

Consequently, the clock jitter synchronous with the disc rotation contained by a clock detected by the non-contact sensor is corrected when the vibration component is extracted. For clock frequencies other than when the clock detected by the non-contact sensor is multiplied or divided by an integer, a clock signal can be generated by setting up an arbitrary format frequency. Further, if the writing timing of the format pattern is corrected preliminarily by measuring an error of the writing start position of each sector due to the frequency deflection synchronous with a rotation, high precision position writing in the circumferential direction of a disc is achieved.

Quantity and Allocation of the Non-contact Sensors

The servo track writing device of the present invention comprises a plurality of pieces of the non-contact sensors for a disc and the vibration extraction processing unit extracts a deflection component synchronous with the rotation at a writing head position according to a clock signal from the plurality of non-contact sensors and outputs a corrected clock signal.

Consequently, a drop of clock accuracy, which occurs if the writing head position does not coincide with a sensor detection point when a non-contact sensor is provided, is prevented so as to generate a high precision clock corresponding to the writing head position.

More specifically, for example, if two non-contact sensors are disposed on the same radius with respect to a disc rotation center, the vibration extraction processing unit extracts and corrects a vibration component by using the frequency deflection of each clock signal output from the two non-contact sensors so as to generate a clock signal matching the writing head position.

Two non-contact sensors are disposed on the same radius with respect to the disc rotation center and at symmetric positions with respect to the disc rotation center. The vibration extraction processing unit extracts and corrects a vibration component by using the frequency deflection of each clock signal output from the two non-contact sensors so as to generate a clock signal matching the position of a writing head.

If the two non-contact sensors are disposed on the same radius with respect to the disc rotation center and at symmetric positions with respect to the disc rotation center, the deflection components of the two non-contact sensors due to disc translation by an inclination of a spindle shaft are equalized although the directions are opposite and therefore, they can be removed by canceling them with each other.

More specifically, the vibration extraction processing unit comprises: a multiplying unit for multiplying clock signals output from the two non-contact sensors; a high-pass filter for extracting a high pass component of output signal of the multiplying unit as a vibration component; and a correcting unit for correcting a clock signal from the non-contact sensor nearer the writing head according to the signal extracted and output by the high-pass filter.

Further, preferably, a plurality of non-contact sensors are disposed at different positions on the disc medium face for the writing head. The vibration extraction processing unit extracts a vibration component inherent of each position using a clock jitter from each clock signal of the plurality of non-contact sensors, obtains a vibration component at the writing head position by averaging or weighing the vibration components of the plurality of positions and then, corrects and outputs a clock signal from a specific non-contact sensor.

Preferably, a plurality of sensor detection points are set up at different positions on a moving trajectory of the writing head relative to the disc, a non-contact sensor is disposed for each of the plurality of sensor detection points and a clock signal in generated from the non-contact sensor closer to the writing head. Consequently, a drop of the clock accuracy, which occurs if the writing head position does not coincide with the sensor detection point, is prevented so as to generate a high precision clock corresponding to the writing head position.

Preferably, the sensor detection point of the non-contact sensor is moved along the moving trajectory of the writing head relative to the disc.

Further, preferably, a detection point is located on the moving trajectory of the writing head on each of at least two faces of stacked medium assembly.

Clock Generation

The clock generating unit comprises: a DDS (direct digital synthesizer) for dividing an input clock signal; a PLL circuit for multiplying a clock signal from the DDS; and a control circuit unit which resets the DDS with an index signal obtained on every turn of a disc. While an output waveform is disturbed during and just after the resetting of the DDS, the clock waveform output by the PLL circuit is fed back and held.

Consequently, any format clock frequency necessary for writing a clock signal from the non-contact sensor can be generated by combining the dividing of the DDS with the multiplication of the PLL circuit. If a clock signal of a format frequency smaller than the resolution of the DDS is generated, a frequency differential which cannot be set up is abolished by resetting the DDS with an index signal obtained on every turn of a disc. Although the output waveform is disturbed by the resetting of the DDS at this time, an influence upon the clock signal which is to be output finally is prevented by holding the PLL circuit.

The clock generating unit may comprise: two DDSs (direct digital synthesizers) for dividing input clock signal in parallel; a switch circuit unit for switching outputs of the two DDSs; a PPL circuit for multiplying a clock signal from a DDS switched by the switching circuit unit; and a control circuit unit which resets the two DDSs alternately according to an index signal obtained on every turn of a disc. While the output waveform is disturbed during and just after the resetting of the one DDS, the switch circuit unit switches to the other DDS and inputs a clock signal without disturbance of the waveform into the PLL circuit. Consequently, although the output waveform is disturbed by the resetting of the DDS, an influence upon the clock signal which is to be output finally is prevented.

Further, the clock generating unit may further comprise a PLL circuit which constitutes a primary multiplying circuit on an input stage of the DDS (direct digital synthesizer).

Measurement of Sector Correction Amount

The sector correction processing unit comprises: a writing/reading unit for writing a reference clock signal into a disc and after a reading; a high precision oscillator for oscillating a high precision clock signal having the same frequency as the reference clock signal; and a differential processing unit which measures a correction clock number indicating an error of the writing start position of each sector according to a differential between a reading clock signal output from the writing/reading unit and a high precision clock signal from a high precision oscillator and holds.

Further, the sector correction processing unit may comprise: a high precision oscillator for oscillating a high precision clock signal having the same frequency as the reference clock signal; and a differential processing unit which measures a correction clock number indicating an error of the writing start position of each sector according to a differential between a clock signal output from the clock generating unit and a high precision clock signal from a high precision oscillator.

The sector correction processing unit may comprise a drive control unit for driving the non-contact sensor in the radius direction and in the circumferential direction so as to cancel the rotation deflection component of the disc.

The sector correction processing unit may comprise a PLL circuit which generates a correction signal for the frequency deflection component synchronous with a disc rotation from a phase error signal in the PLL circuit so as to correct a clock signal of a format frequency.

More specifically, the sector correction processing unit memorizes a phase error signal of a loop filter in the PLL circuit corresponding to a single turn in a memory synchronously with an index signal of a disc upon measurement, reads out the phase error signal memorized in the memory synchronously with the rotation of a disc upon correction and corrects the output signal of the loop filter.

Disc to be Written on

In the servo track writing device of the present invention, the disc is composed of a disc stack including a stacked plurality of discs to be written on mounted on the rotation shaft of a spindle shaft and a target disc in which a scale with the clock pattern is formed on the surface of one side of the disc stack fixed coaxially.

Further, in the servo track writing device of the present invention, the disc is a disc accommodated in an assembled air-tight enclosure, a scale with the clock pattern is mounted on the surface of a clamper on the accommodated disc and a sensor window is formed of a transparent member air-tight at a position allowing the scale to be seen from outside while the non-contact sensor is disposed outside.

Method

The present invention provides a servo track writing method in which each track on a disc medium plane is divided to a plurality of sectors and a format pattern signal containing a servo frame signal is written into each sector, the servo track writing method comprising: a clock detecting step for detecting a clock pattern formed on a disc rotated at a constant speed through non-contact sensors and outputting the clock pattern; a clock generating step for generating a clock signal of arbitrary format frequency set up preliminarily based on a clock signal of a predetermined frequency from non-contact sensors; and a writing processing step for writing a format pattern signal into the disc medium face according to a synchronous signal of a turn of the disc and the clock signal of the format frequency.

The feature of the servo track writing method is further comprising a vibration extraction step for correcting a clock jitter by extracting a deflection component synchronous with a rotation from the clock signal of the non-contact sensor by means of the vibration extraction processing unit.

Another feature of the servo track writing method of the present invention further comprises a sector correction step for measuring an error due to a frequency deflection synchronous with a rotation with respect to a preliminarily determined writing start position for each sector of the disc by means of a sector correction processing unit and correcting a writing start position of a format pattern signal for each sector including a servo frame signal stored in a memory according to the measured error. In the meantime, basically, the detail of the servo track writing method produces the same effect as the servo track writing device.

The above and other objects, features, and advantages of the present invention will become more apparent from the following detailed description with reference to the drawings.

BRIEF DESCRIPTION OF THE DRAWINGS

FIGS. 5A and 5B are graphs of histogram of relative jitter of each of a conventional reference head and the non-contact sensor of the present invention;

FIG. 6 is a block diagram of the embodiment of the clock generating unit of FIG. 2;

FIGS. 7A to 7E are time charts of a frequency differential amount which the DDS cannot process;

FIGS. 8A to 8D are time charts of a waveform deflection which is generated by resetting the DDS;

FIG. 9 is a block diagram of the embodiment of the sector correction processing unit in FIG. 2;

FIG. 10 is a time chart for high precision clock and fixed clock when a correction address value is obtained by the sector correction processing;

FIG. 11 is an explanatory diagram of a sector address table which stores a sector writing start address;

FIG. 14 is an explanatory diagram of a format pattern memory before correction;

FIG. 15 is an explanatory diagram of a format pattern corrected by a correction address number indicating a timing delay;

FIG. 16 is an explanatory diagram of a format pattern table corrected by a correction address number indicating a timing progress;

FIG. 17 is a graph of measurement results of sector length in each sector before and after sector correction;

FIGS. 18A and 18B are explanatory diagrams of a disc enclosure which the present invention is applied to;

DETAILED DESCRIPTION OF THE PREFERRED EMBODIMENT

Figure 1:
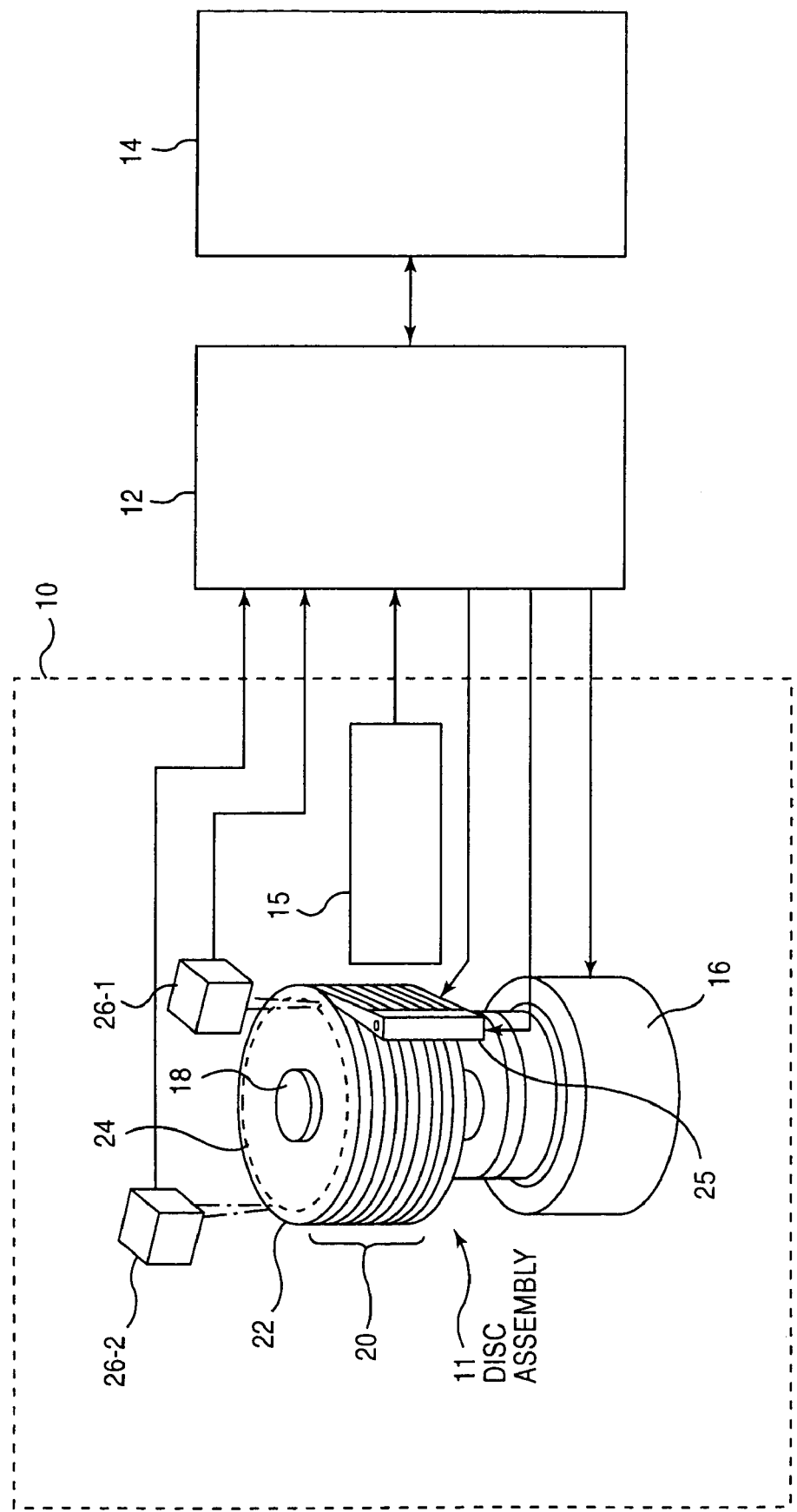
FIG. 1 is an explanatory diagram of the structure of an apparatus having the servo track writing device of the present invention.

FIG. 1 is an explanatory diagram of the structure of an apparatus having the servo track writing device of the present invention. Referring to FIG. 1, the apparatus for writing into the servo track comprises a working bed 10, a servo track writing device 12 of the present invention and an upper level device 14. The working bed 10 includes a disc assembly 11 which is an object for the servo track writing.

The disc assembly 11 contains a disc stack 20 in which a plurality of discs are stacked around a spindle shaft 18 of a spindle motor 16. A target disc 22 is loaded on the top of this disc stack 20 and an encoder scale 24 is formed in the surface of the target disc 22. The encoder scale 24 is formed by bonding a scale pattern or writing into the target disc 22. According to this embodiment, two non-contact sensors 26-1, 26-2 are disposed for the encoder scale 24 of the target disc 22. The non-contact sensors 26-1, 26-2 read the encoder scale 24 by irradiation of a laser beam and output of a clock signal of a predetermined frequency to the servo track writing device 12. Then, a clock signal of a format frequency is generated from this clock signal in order to achieve synchronism between a write position in the circumferential direction of each medium on the disc stack 20 and a write signal. Although this embodiment adopts a method for reading the encoder scale 24 by laser through the non-contact sensors 26-1, 26-2, it is permissible to employ an appropriate other non-contact sensor such as a sensor using Kerr effect, a Doppler sensor, or a sensor using electrostatic capacity. The disc assembly 11 is provided with a positioner 25, which moves and positions a head to each medium face of the disc stack 20 so as to write/read a signal. The position of this positioner 25 is detected by an actuator position sensor 15, so that a position of the medium face in the radius direction on the disc stack 20 can be detected accurately. The non-contact sensor is employed for the actuator position sensor 15 as well as when a clock is detected. According to this embodiment, the non-contact sensors 26-1, 26-2 are disposed symmetrically with respect to a disc rotation center on an equal radius of a target disc 22.

Figure 2:
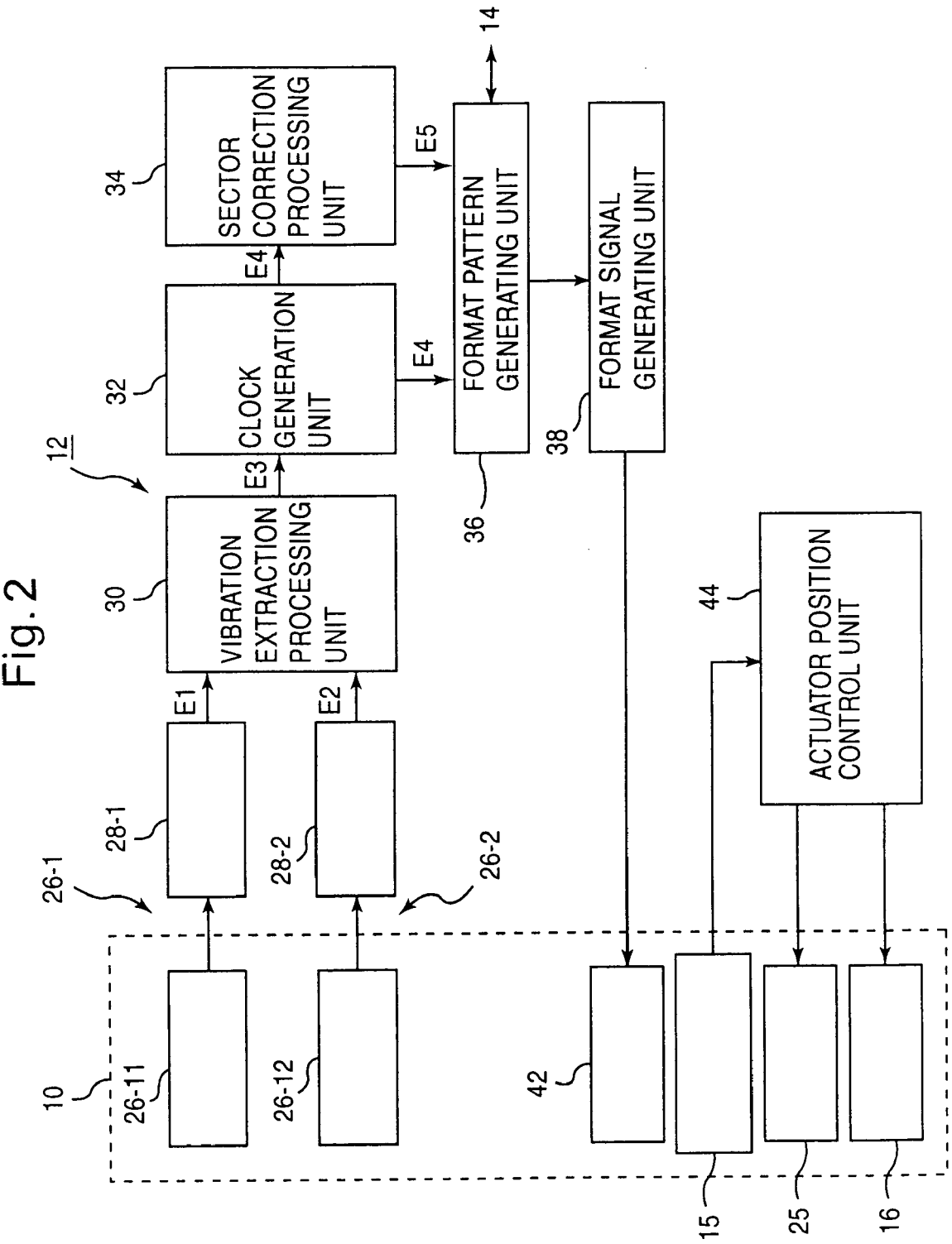
FIG. 2 is a block diagram of an embodiment of the servo track writing device of the present invention.

FIG. 2 is a block diagram showing the embodiment of the servo track writing device 12 of the present invention in FIG. 1. Referring to FIG. 2, the servo track writing device 12 includes sensor head control units 28-1, 28-2 of the non-contact sensors 26-1, 26-2, a vibration extraction processing unit 30, a clock generating unit 32, a sector correction processing unit 34, a format pattern generating unit 36, a format signal generating unit 38 and an actuator position control unit 44. The non-contact sensor 26-1 comprises the sensor heads 26-11, 26-12 provided on the side of the working bed 10 and the sensor head control units 28-1, 28-2 provided on the side of the apparatus, the head sensor control units outputting fixed frequency signals E1, E2 by reading the encoder scale 24 formed on the target disc 22. The vibration extraction processing unit 30 extracts a deflection component synchronous with a disc rotation from the fixed frequency signals E1, E2 of the non-contact sensors 26-1, 26-2 and outputs a fixed frequency clock signal E3 by correcting a clock jitter. The clock generating unit 32 outputs a format frequency clock signal E4 by converting the fixed frequency clock signal E3 from the vibration extraction processing unit 30 to an arbitrary frequency set up preliminarily or a format frequency necessary for writing of a format pattern by multiplication or dividing. The sector correction processing unit 34 measures an error due to frequency deflection synchronous with a rotation with respect to each sector writing start position of a track in a predetermined disc and corrects the writing start position of the format pattern signal in each sector including a servo frame signal stored in a memory according to this measuring error (correction clock number). The format pattern generating unit 36 reads out a format pattern signal whose writing start position is corrected by the sector correction processing unit 34 from a memory based on an index signal obtained every turn of the disc and the format frequency clock signal E4 obtained from the clock generating unit 32 and writes the format pattern into a head group 42 of the disc stack 20 under an accurate control on a write position in the circumferential direction. The actuator position control unit 44 detects and controls a write position in the radius direction on the medium face of the disc stack 20 based on a detection signal from the actuator position sensor 15. In the servo track writing device 12 shown in FIG. 3, a system from the non-contact sensors 26-1, 26-2 to a servo writing control unit 40 is provided as a servo system for a writing clock and on the other hand, a system from the actuator position sensor 15 to the actuator position control unit 44 is provided as a sub-system for actuator position control.

Figure 3:
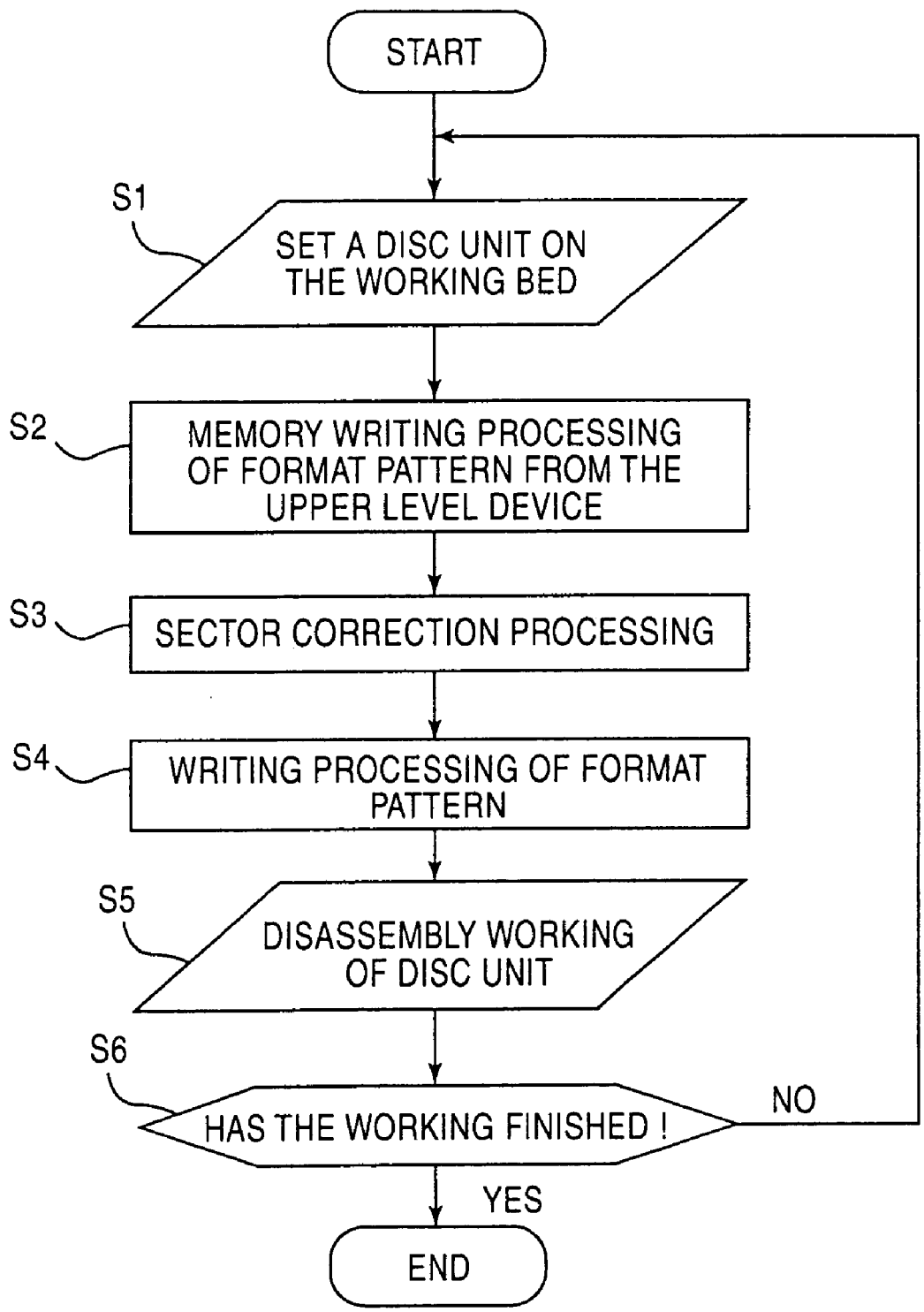
FIG. 3 s a flow chart about processing steps using the servo track writing device of the present invention.

FIG. 3 shows the procedure for processings in an apparatus using the servo track writing device 12 of the present invention. First, in step S1, a disc assembly 11 is set on the working bed 10 as shown in FIG. 2 and subsequently, in step S2, format patterns for all tracks intended to be written into discs are written into a format pattern memory provided on the format pattern generating unit 36 in the servo track writing device 12 from the upper level device 14. In step S3, the sector correction processing unit 34 in FIG. 3 measures an error of the writing start position in each sector for the format pattern based on a format frequency clock signal originated from a rotation deflection of a disc and then, carries out sector correction processing for correcting the start position in the format pattern memory written in step S2 by only the amount corresponding to this measuring error. After the sector correction processing for the format pattern memory is completed, in step S4, format pattern writing processing is executed by using a format frequency clock signal based on detection signals from the non-contact sensors 26-1, 26-2 as write clock signals in the direction of each track of a disc in liaison with positioning control in the disc radius direction by the actuator position control unit 44. If in step S4, the format pattern writing processing is terminated for all tracks, the disc assembly 11 is removed from the working bed 10 in step S5 and unless the processing is terminated in step S6, the processing is returned to step S1, in which a next disc assembly 11 is set on the working bed 10 and then the same processing is repeated.

Figure 4:
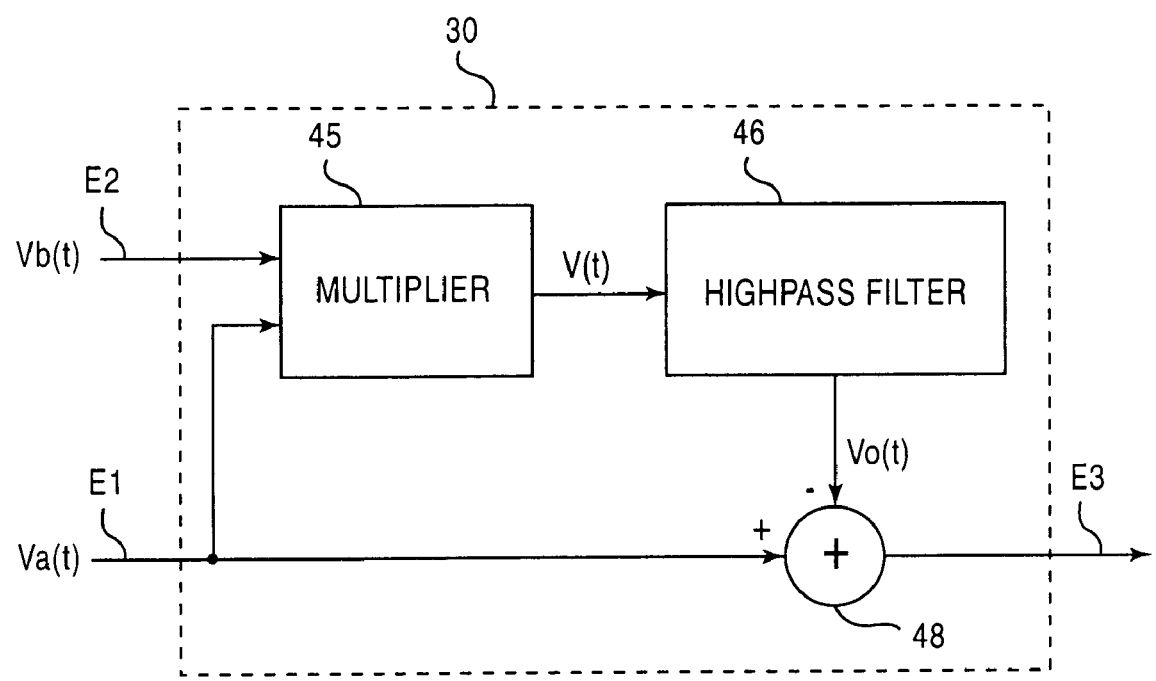
FIG. 4 is a block diagram of the embodiment of a vibration extraction processing unit in FIG. 2.

FIG. 4 is a block diagram of the embodiment of the vibration extraction processing unit 30 in FIG. 3. In this vibration extraction processing unit 30, fixed frequency signals E1, E2 from the two non-contact sensors 26-1, 26-2 for the disc assembly 11 in FIG. 2 are input and a vibration component of a disc is extracted from this input signal to correct the clock jitter. Here, the allocation of the non-contact sensor according to the present invention will be described. A sensor detection point by the non-contact sensor 26-1 shown in FIG. 2 is preferred to coincide with a writing head position for formatting. However, because the non-contact sensor 26-1 is fixed while the writing head is moved in the radius direction along the disc medium plane by the positioner 25, both of them do not always coincide with each other. If a non-contact sensor is provided in this way, it is physically difficult to coincide the sensor detection point with the writing head position completely although the clock can be generated and consequently, the accuracy of the clock drops. Thus, according to the present invention, a plurality of non-contact sensors are disposed and a detection signal obtained from each non-contact sensor or a clock generated from the sensor detection signal is input to the vibration extraction processing unit 30 and then, a vibration component is extracted to correct the jitter. According to the embodiment shown in FIG. 2 based on the basic concept of the present invention of using the plurality of non-contact sensors, the two non-contact sensors 26-1, 26-2 are disposed. The sensor detection points of the two non-contact sensors 26-1, 26-2 are disposed on the same radius of a disc and at symmetric positions with respect to a disc rotation center. The principle of vibration extraction using the two non-contact sensors 26-1, 26-2 disposed in such a way is as follows. Assuming that the fixed frequency signal E1 from the non-contact sensor 26-1 is Va(t) and that the fixed frequency signal E2 from the non-contact sensor 26-2 is Vb (t), multiplying these two signals by a multiplier 45 produces the following equation.

$$V(t) = \sin(\omega + \Delta\omega_R + \Delta\omega_{PA})t \cdot \sin(\omega + \Delta\omega_R + \Delta\omega_{PB})t \quad (1)$$
$$= -1/2\{\cos(2\omega + 2\Delta\omega_R + \Delta\omega_{PA} + \Delta\omega_{PB})t - \cos(\Delta\omega_{PA} - \Delta\omega_{PB})t\}$$

$\begin{cases} V(t)\text{: sensor output signal} \\ \sin(\omega + \Delta\omega_R + \Delta\omega_{PA})t\text{: output signal of sensor } A \\ \sin(\omega + \Delta\omega_R + \Delta\omega_{PA})t\text{: output signal of sensor } B \\ \omega\text{: angular velocity} \\ \Delta\omega_R\text{: frequency deflection component produced by} \\ \quad \text{disc rotation} \\ \Delta\omega_{PA}, \Delta\omega_{PB}\text{: frequency deflection component} \\ \quad \text{produced by disc translation vibration detected} \\ \quad \text{by each sensor} \end{cases}$ Because the first item of the right side of the equation (1) is high frequency component while the second item is low frequency component, each item can be distinguished easily through a filter or the like. Because the high frequency component affects the clock jitter of the rotation deflection, the low frequency component of the second item is extracted by a bypass filter 46 provided after the multiplier 45. The high frequency component signal V0(t) extracted from this bypass filter 46 is subtracted from the fixed frequency signal E1 from the non-contact sensor 26-1 by an adder 48 so as to correct the clock jitter. If the non-contact sensors 26-1, 26-2 shown in FIG. 1 are provided at symmetric positions with respect to a disc rotation center on an equal radius, the translation motion of a disc due to a fall of the spindle shaft 18 is the sum of both ($\Delta\omega_{PA}+\Delta\omega_{PB}$). However, these frequency deflection components are canceled by each other and removed because they are equal in magnitude and opposite in direction and the frequency deflection due to the translation motion is not included. Further, the non-contact sensors 26-1, 26-2 are disposed on the working bed 10 with a sufficiently high stiffness maintained in order to protect it from disturbance due to vibration of the spindle motor 16. Further, because the opposition accuracy in thexial direction of a disc of the non-contact sensors 26-1, 26-2 affects theccuracy of direction components of an extracted disc rotation vibration largely, the heads of the non-contact sensors 26-1, 26-2 are not positioned precisely by an adjusting mechanism.

FIGS. 5A and 5B show correction about the clock jitter by the vibration extraction processing unit 30 by comparing with the conventional method. FIG. 5A shows a relative jitter histogram 128 using a conventional reference head while the jitter value σ is 681.25 ps. Contrary to this, FIG. 5B shows a relative jitter histogram 130 of the present invention using the vibration extraction processing unit 30 while the jitter value σ is 481.00 ps, which indicates that it is approximately 30% lower than a case for the conventional reference head.

FIG. 6 is a block diagram of the embodiment of the clock generating unit 32 in FIG. 2. The clock generating unit 32 of this embodiment comprises a primary multiplying circuit 82, a high resolution dividing circuit 84 and a secondary multiplying circuit 86. The primary multiplying circuit 82 includes a PLL circuit 88 and its divider 90. The high resolution dividing circuit 84 includes a DDS 92, a low-pass filter 94 and a comparator 96. The secondary multiplying circuit 86 includes PLL circuits 100, 102 and their dividers 101, 104. In such a clock generating circuit 32, an input fixed frequency clock signal E3 is subjected to multiplication by the PLL circuit 88, dividing by the DDS 92 and multiplication by two-stage PLL circuits 100, 102 successively and converted to format frequency clock signal E4 so that its input frequency $f_{in}$ turns to output frequency $f_{out}$ and output That is, the output frequency $f_{out}$, which is a format frequency, is expressed as $$f_{out}=R\times(1/P)\times(N_1\times N_2)\times f_{in} \quad (2)$$

The frequency $f_{in}$ of the fixed frequency clock signal E3 is, for example, 27 MHz. The format frequency $f_{out}$ to be output by multiplication and dividing can be set arbitrarily within a range of 50 MHz–320 MHz depending on setting of a desired dividing ratio.

In the clock generating unit 32 of FIG. 6, a control circuit unit 105 performs resetting of the DDS 92 and holding of the PLL circuit 100 synchronously with index pulse E6 accompanied by a disc rotation. Although a switching circuit 98 is provided between the PLL circuit 100 and the comparator 96 so as to hold the PLL circuit 100 so that usually, this circuit is switched to a contact b, the switching circuit 98 is switched to a contact a so as to protect from an influence due to a deflection of output waveform of the DDS 92 when the DDS 92 is reset by output of a reset signal E11 and then, an output clock is fed back to the PLL circuit 100, so that the output of the PLL circuit 100 is maintained in a constant condition. A setting method and a problem about any format frequency in the clock generating unit 32 in FIG. 7 and its solution method will be described in detail. To correspond to every format pattern and disc rotation number, the servo track writing device of the present invention needs to have a function for converting a fixed clock signal detected through the non-contact sensor to a clock signal of any format frequency. Usually, the DDS 92 is employed to change the frequency as shown in FIG. 6. The DDS 92 is a kind of lookup table which stores a sine value of the angle of a predetermined resolution as address data and by changing a specified interval (angular interval) of the address, the cycle of its sine waveform changes digitally, thereby making it possible to set up any frequency. However, the frequency cannot be set to any one below the frequency of a predetermined resolution.

FIGS. 7A to 7E show comparisons of a case where no differential occurs between the format frequency and a set frequency for using the DDS 92 and a case where a differential occurs. FIGS. 7A and 7B show the case where no differential occurs between the format frequency and the set frequency. No difference in phase exists between n turns in FIG. 7A and (n+1) turns in FIG. 7B if viewed from a timing of an index pulse 112 in FIG. 7E. FIGS. 7C and 7D show the case where a differential exists between the format frequency and the set frequency for using the DDS 92. That is, a difference in phase Δθ is generated between n turns in FIG. 7C and (n+1) turns in FIG. 7E if viewed from the timing of the index pulse 112. The set frequency differs from the format frequency so that a differential occurs. To avoid a problem which may occur when the difference in phase occurs as indicated in FIGS. 7C and 7D, the present invention adopts following two methods.

(1) Setting a dividing value 95 for the DDS 92 in order to output a frequency nearest the format frequency $f_{out}$ from the frequency $f_{in}$ of a fixed frequency clock signal (2) For a frequency having a differential which the DDS 92 cannot set, abolishing that differential by resetting the DDS 92 for each index.

The resetting of the DDS 92 will be described in detail. If the set frequency is 2000 Hz while the format frequency is, for example, 2000.6 Hz, the differential frequency is 0.6 Hz and then, this is abolished by resetting the DDS 92 for each index. Consequently, frequencies below the set resolution for the DDS 92 can be treated appropriately. On the other hand, if the DDS 92 is reset to abolish the differential frequency, the output signal of the DDS 92 is disturbed at this time.

FIGS. 8A to 8D show a disturbances of the output waveform when the DDS 92 is reset. FIG. 8A indicates a DDS output signal 114 and this waveform indicates a sine waveform after passing the low-pass filter 94 of FIG. 6. This DDS output signal 114 is input to the comparator 96 so that a comparator output signal 116 having a rectangular waveform shown in FIG. 8B is produced. FIG. 8C indicates an index pulse 118 while a drop of this index pulse 118 indicates an index timing t1. If this index pulse 118 is acquired, a reset signal 120 as shown in FIG. 8D is output synchronously therewith and then, the DDS 92 is reset. This reset generates a disturbance 122 in the waveform in the DDS output signal 114. An influence of the disturbance in the waveform, which is generated by the resetting for abolishing the differential frequency in the DDS 92, is blocked by holding the PLL circuit 100 on a next stage. After the control circuit 105 outputs the reset signal E11, it outputs a hold signal E12 to the switching circuit 98 over a predetermined time after the reset signal is output until the disturbance in the waveform settles and then, switches an input to the PLL circuit 100 to a feedback input of the clock output. Consequently, the output condition of the PLL circuit 100 is held in a specific condition while the waveform is disturbed.

FIG. 9 is a block diagram of the embodiment of the sector correction processing unit 34 in FIG. 2. This sector correction processing unit 34 comprises a clock writing unit 52, a clock reading unit 54, a high precision oscillator 56, a differential processing unit 58, and a correction information table 60. The differential processing unit 58 contains a sector address table 68. The sector correction processing unit 34 is actuated before format pattern writing processing in step S3 in the processing procedure of FIG. 3 so as to create the correction information table 60. The principle of the sector correction processing aiming at removing a frequency deflection component synchronous with a disc rotation will be described here. In the conventional formatting using a reference head, a problem of frequency deflection synchronous with a rotation originating from a rotation deflection of a disc medium does not occur. The reason is that the format pattern is written synchronously with the rotation deflection, so that necessarily a frequency deflection component synchronous with a rotation is canceled. In case of using a format frequency clock signal detected with the non-contact sensor as proposed by the present invention, correction of the frequency deflection synchronous with a rotation is absolutely necessary. Factors for generating the frequency deflection synchronous with this rotation can be as follows.

(1) Eccentricity generated when the encoder scale is bonded
(2) Deflection of the encoder scale face in vertical direction
(3) Deflection in rotation of a disc; and
(4) Unevenness of pattern density on the encoder scale The format frequency clock signal containing such a factor for generating the frequency deflection needs to undergo correction of the frequency deflection component. A characteristic in the graph of FIG. 18 is valid when no correction of the frequency deflection is performed. In the graph of FIG. 18, its abscissa axis indicates a sector number and the ordinate axis indicates a sector time corresponding to a sector length and an ideal time 108 is an object value. In this case, the characteristic 106 when the frequency deflection is not corrected is largely apart from the ideal time and therefore, a format frequency clock signal generated through the non-contact sensor cannot be applied to writing of the format pattern until the frequency deflection is corrected.

In the sector correction processing unit 34 of FIG. 9, a reference signal used for correction is written into a medium face of the disc 20-1 through the head 50 and after this writing, the clock reading unit 54 reads out the reference signal E7 through the head 50. A reading reference signal from the disc 20-1 read from the clock reading unit 54 is compared with the high precision clock signal E8 from the high precision oscillator 56 by the differential processing unit 58 so as to obtain a differential and an error relative to the writing start position of each sector is stored in the correction information table 60 based on this differential as a clock number of a generated format frequency clock signal, more specifically an address number determined by the clock number.

Figure 12:
FIG. 12 is an explanatory diagram of a correction information table which stores correction address number obtained by the sector correction processing in FIG. 9.

FIG. 10 indicates a reference signal E7 acquired by the clock reading unit 54 in the differential processing unit 58 and a clock signal E8 from the high precision oscillator 56 with reference to an index pulse. That is, high precision clocks 66-1, 66-2, . . . 66-95 are obtained synchronously with an index pulse 62-0 and correspondingly, reference clocks 64-0, 64-1, . . . 64-95 read out from a disc are obtained. The differential processing unit 58 acquires a difference between both and that difference is expressed by a clock number of the format frequency clock signal used for writing the format pattern. Further, because the format frequency clock signal corresponds to an address of the format pattern memory, a differential pulse count is expressed as correction address number $\Delta A1$, $\Delta A2$, . . . $\Delta A95$. More specifically, because the writing start addresses A0-A95 of the high precision clocks 66-1 to 66-95 including the index pulse 62-0 are determined preliminarily, a clock number which is a difference with respect to reference clocks 64-0 to 64-95 obtained by reading a disc is acquired as a correction address number and the correction information table 60 shown in FIG. 12 is created.

Figure 13:
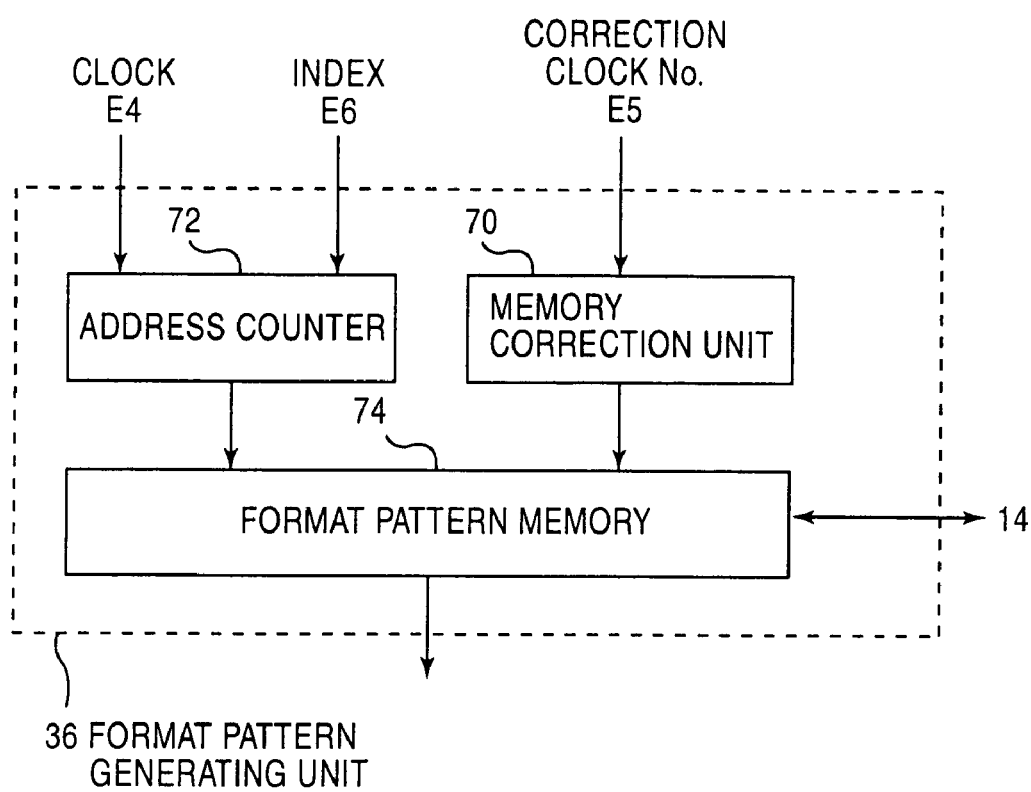
FIG. 13 is a block diagram of the embodiment of a format pattern generating unit in FIG. 2.

FIG. 13 shows the embodiment of the format pattern generating unit 36 in FIG. 2. This format pattern generating unit 36 comprises a memory correcting unit 70, an address counter 72 and a format pattern memory 74. A preliminarily determined format pattern to be written into a disc is transferred from the upper level device 14 to a format pattern memory 74 and written therein. This format pattern is constructed in the form of, for example, a memory map shown in FIG. 14. The format pattern memory 74 of FIG. 14 is a format pattern for some track and accommodates format patterns corresponding to sector numbers 0-95 of a single track. The width of the format pattern memory 74 is expressed in sector size 76 while a servo sector region 78 is provided at the head. A data region 80 is provided subsequent thereto. If for example a sector number 0 is taken as an example, the format pattern is composed of a servo sector 78-0 and a data sector 80-0. This servo sector 78-0 is provided with a servo mark, a track number using gray code, or an index, for example, a servo pattern corresponding to positions A, B, C, D for a phase servo. The data sector 80-0 has a preliminarily determined format pattern for the data sector. Although FIG. 14 shows a case where a track is composed of 0–95 sectors, other tracks store the same format pattern except that the track numbers of its sector servo region are different. After a format pattern is written into the format pattern memory 74 from the upper level device as shown in FIG. 14, the memory correcting unit 70 corrects by shifting an address of a format pattern writing start position in each sector by using correction address number data ΔA0-ΔA95 accommodated in the correction information table 60 in the sector correction processing unit 34, for example, the correction information table 60.

FIG. 15 shows the content of storage in the format pattern memory 74 after a proper writing position is corrected by only the amount corresponding to a correction address number in the direction for a delay by the memory correcting unit 70. As for the format pattern of a sector number 0, for example, the servo sectors 78-0 and sector data 80-0 are shifted by only the amount of a correction address number ΔA0 with respect to the position before the correction of FIG. 14 in the delay direction.

FIG. 16 is an explanatory diagram of the format pattern memory 74 in which the writing start position before the correction is shifted forward. If, for example, a sector number 1 is shifted forward by the correction address ΔA1, the head of the servo sector is shifted so that it comes after preceding data sector 80-0 of the sector number 0.

FIG. 17 shows a comparison of the characteristic 107 of the present invention with the characteristic 106 before correction in the format pattern memory 74 in which the frequency deflection component is corrected. As evident from the characteristic 107, the deflection amount of the characteristic 107 of the present invention with respect to the ideal time 108 is suppressed sufficiently, so that a format pattern can be written in the circumferential direction by a format frequency clock signal detected by the non-contact sensor at a sufficiently high precision.

Figure 18A:
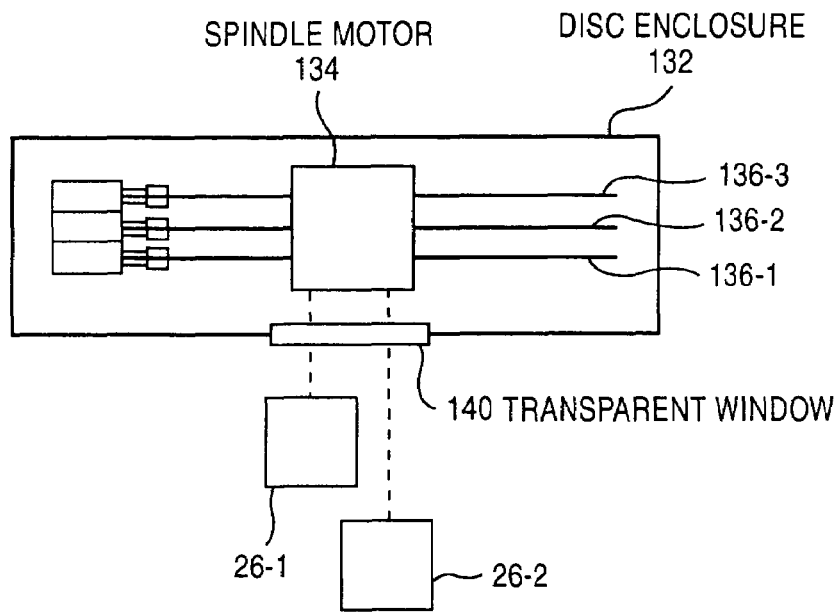
Figure 18B:
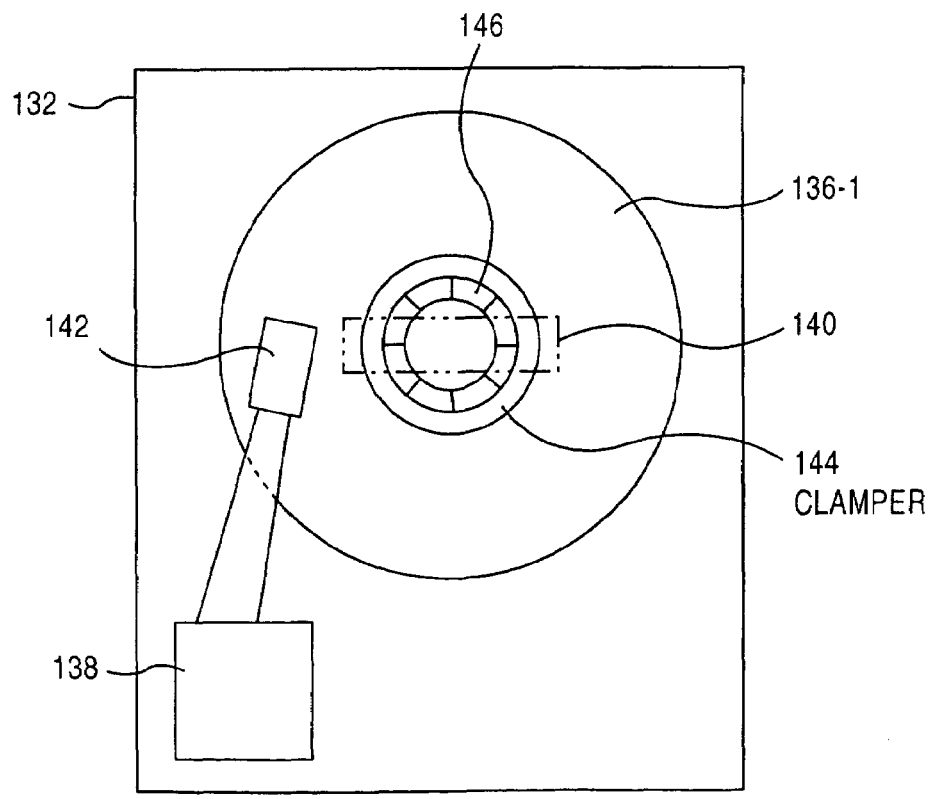

FIGS. 18A and 18B show examples of the other disk assembly to which the servo track writing device can be applied, and it targets at the assembled disc enclosure. Referring to FIG. 18, a disc enclosure 132 includes a spindle motor 134, discs 136-1 to 136-3, a positioner 138, and a head 142, these components being sealed tightly in a case. The discs 136-1 to 136-3 are fixed to the spindle motor 134 by tightening of a clamper 144. The disc enclosure 132 is provided with a transparent window 140, which is made of a sealed glass member or the like, at a position allowing the clamper 144 to be seen in order to enable calling of clocks by allocation of the non-contact sensors 26-1, 26-2 of the present invention. An encoder scale 146 is bonded on the damper 144 and sensor detection points are set up on this encoder scale 146 for the non-contact sensors 26-1, 26-2. If it is intended to detect the motion of the head 142 by the positioner 138 by non-contact through the actuator position sensor 15 like the embodiment shown in FIG. 2, it is permissible to provide a transparent window composed of a sealed glass member at a position allowing the positioner 138 to be seen like the transparent window 140 so as to locate the same position sensor which detects by non-contact. Next, other embodiments about the allocation of the non-contact sensor in the servo track writing device 12 of FIG. 2 and the vibration extraction processing unit 30, the clock generating unit 32 and the sector correction processing unit 34 will be described.

Figure 19:
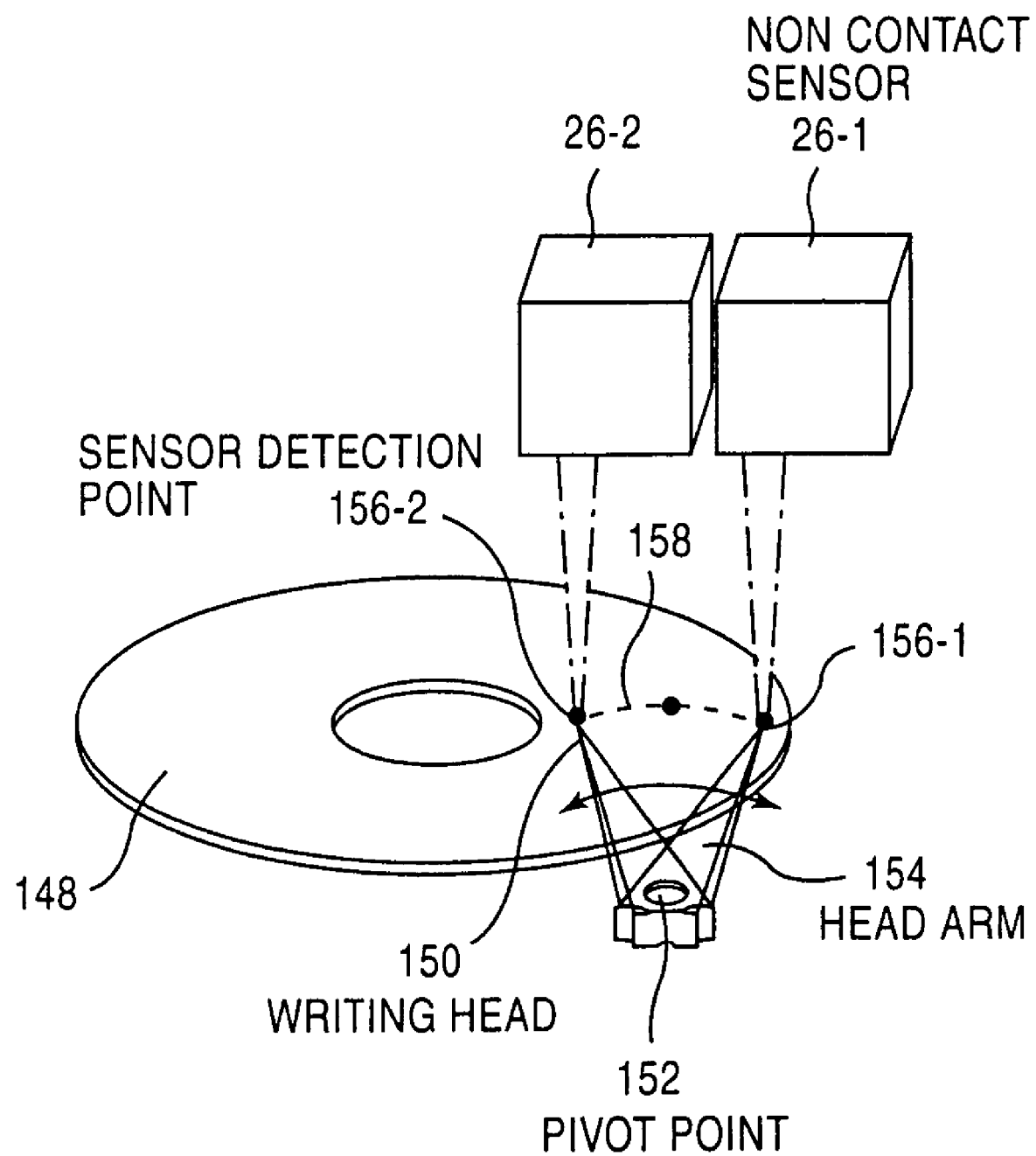
FIG. 19 is an explanatory diagram of the non-contact sensor allocation of the present invention for setting a plurality of sensor detecting points on the moving trajectory of a writing head.

FIG. 19 shows other embodiment of the non-contact sensor of the present invention. The sensor detection point of the non-contact sensor of the present invention is preferred to be equal to the position of the writing head for formatting. Thus, according to the embodiment shown in FIG. 19, a plurality of sensor detection points 156-1, 156-2 are set up on a moving trajectory of the writing head 150 with respect to a pivot point 152 of a head arm 154. For example, the non-contact sensors 26-1, 26-2 are disposed corresponding to these sensor detection points 156-1, 156-2. In this case, the writing head 150 selects a non-contact sensor corresponding to a sensor detection point nearest a head position in which it is about to write a format and generates a clock signal.

Figure 20:
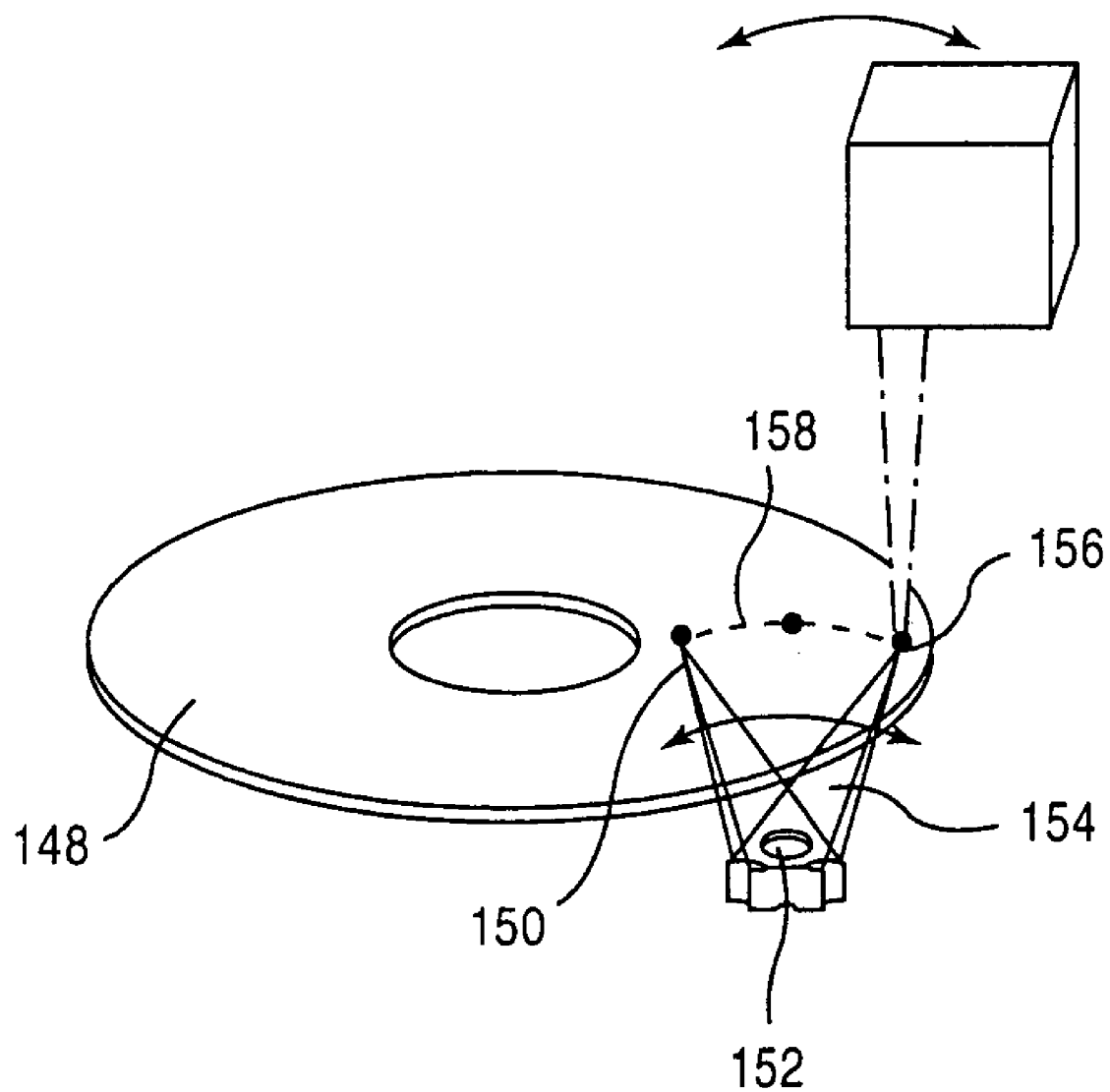
FIG. 20 is an explanatory diagram of the non-contact sensor allocation of the present invention for moving the sensor detection points on the moving trajectory of the writing head.

FIG. 20 shows another embodiment in which the sensor detection point of the non-contact sensor is matched with the writing head position. The feature of this embodiment is that a sensor detection point 156 of the non-contact sensor 26 is moved along a moving trajectory 158 of the writing head 150 by the head arm 154 with respect to the pivot point 152. Thus, the non-contact sensor 26 is swiveled by an appropriate driving mechanism with respect to the pivot point 152 like the head arm 154, so that the sensor detection point 156 is moved along the moving trajectory 158.

Figure 21:
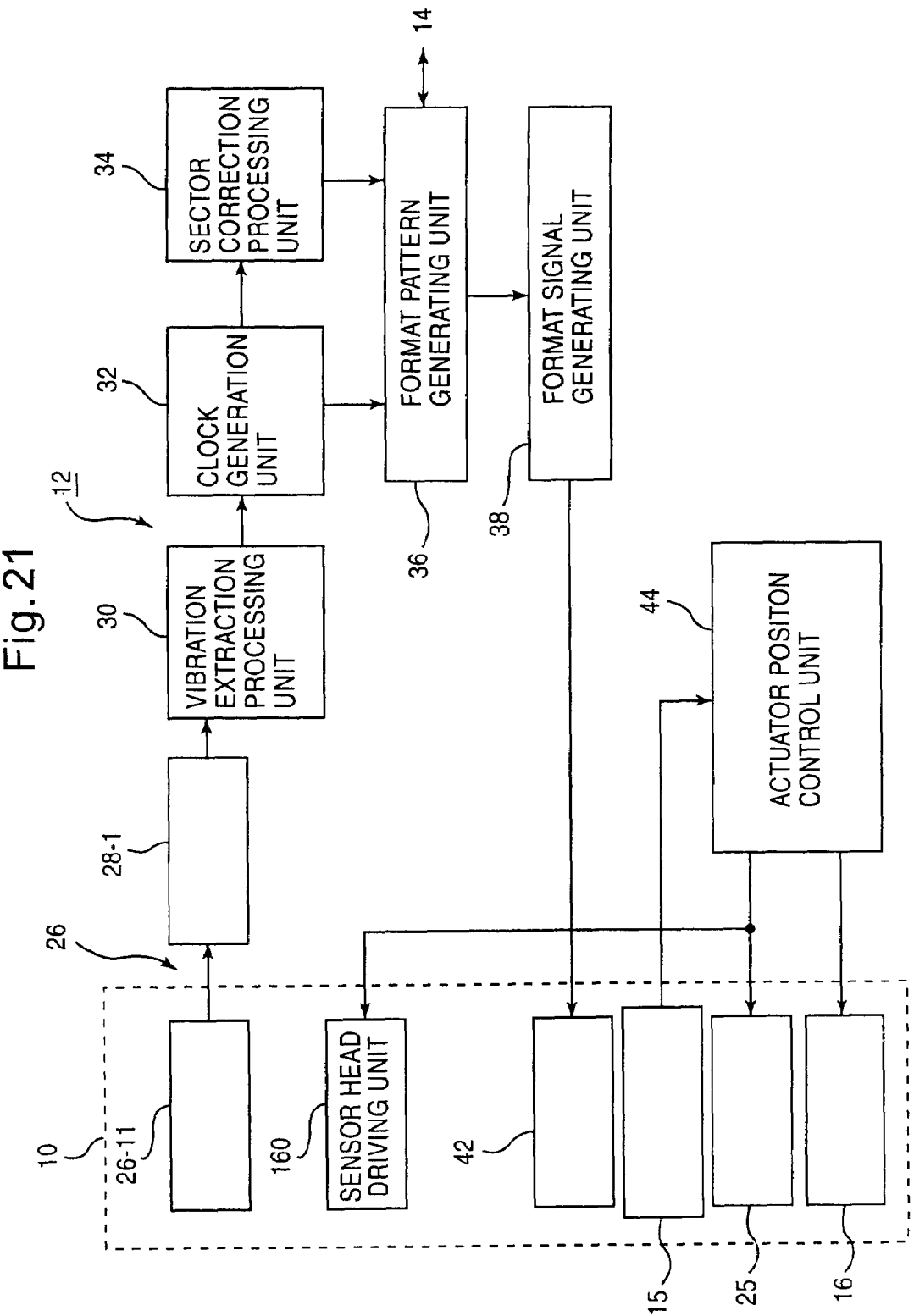
FIG. 21 is a block diagram of the embodiment of the servo track writing device of the present invention provided with a sensor driving function of FIG. 20.

FIG. 21 is a block diagram of the servo track writing device capable of moving the non-contact sensor 26 of FIG. 21. The working bed 10 includes a sensor head driving unit 160 for moving the sensor head 26-11 of the non-contact sensor 26 along the moving trajectory 158 in FIG. 20. Because this sensor head driving unit 160 is allowed to move in the same way as the writing head 150 at a head of the head arm 154, it may be driven according to a write control signal from the actuator position control unit 44 to the positioner 25.

Figure 22:
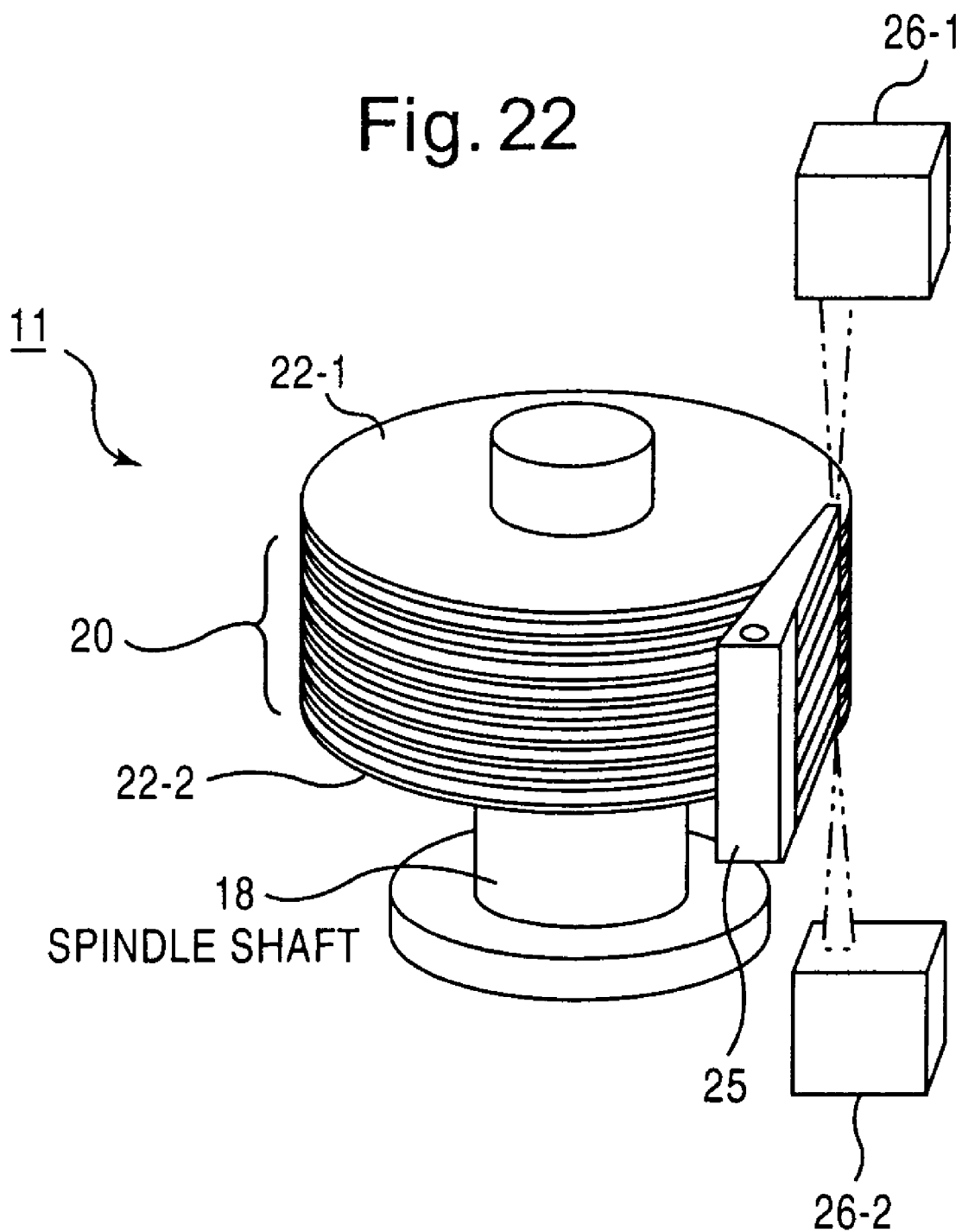
FIG. 22 is an explanatory diagram of the allocation of sensors for extracting and correcting a vibration component by disposing the non-contact sensors above and below a disc stack.

FIG. 22 shows another embodiment of the non-contact sensor 26 of the present invention, in which non-contact sensors 26-1, 26-2 are disposed up and down against two faces of the target discs 22-1, 22-2 of the disc stack 20 mounted on the disc assembly 11. The example in which the non-contact sensors 26-1, 26-2 are disposed up and down in the axial direction of the disc stack 22 is appropriate for a case where the vibration modes of the upper target disc 22-1 and the lower target disc 22-2 are different due to a fall of the spindle shaft 18. That is, the vibration component of the upper target disc 22-1 is extracted by the non-contact sensor 26-1 while the vibration component of the lower target disc 22-2 is extracted by the non-contact sensor 26-2. For respective discs in the disc stack 22 located between the both, an average of upper and lower vibration components is computed or a coefficient is computed from a preliminarily measured component and the vibration component is corrected. This value is added to a fixed frequency signal obtained from a non-contact sensor 26-1 as the adder 48 of the vibration extraction processing unit 30 does so as to correct the clock jitter. Next, an embodiment in which a plurality of non-contact sensors of the present invention are disposed will be described. Although the clock can be generated by a single non-contact sensor, it is physically difficult to match the sensor detection point with the writing head position completely and a drop of clock accuracy is induced. Thus, as a preferable embodiment of the present invention, a plurality of non-contact sensors are disposed.

Figure 23:
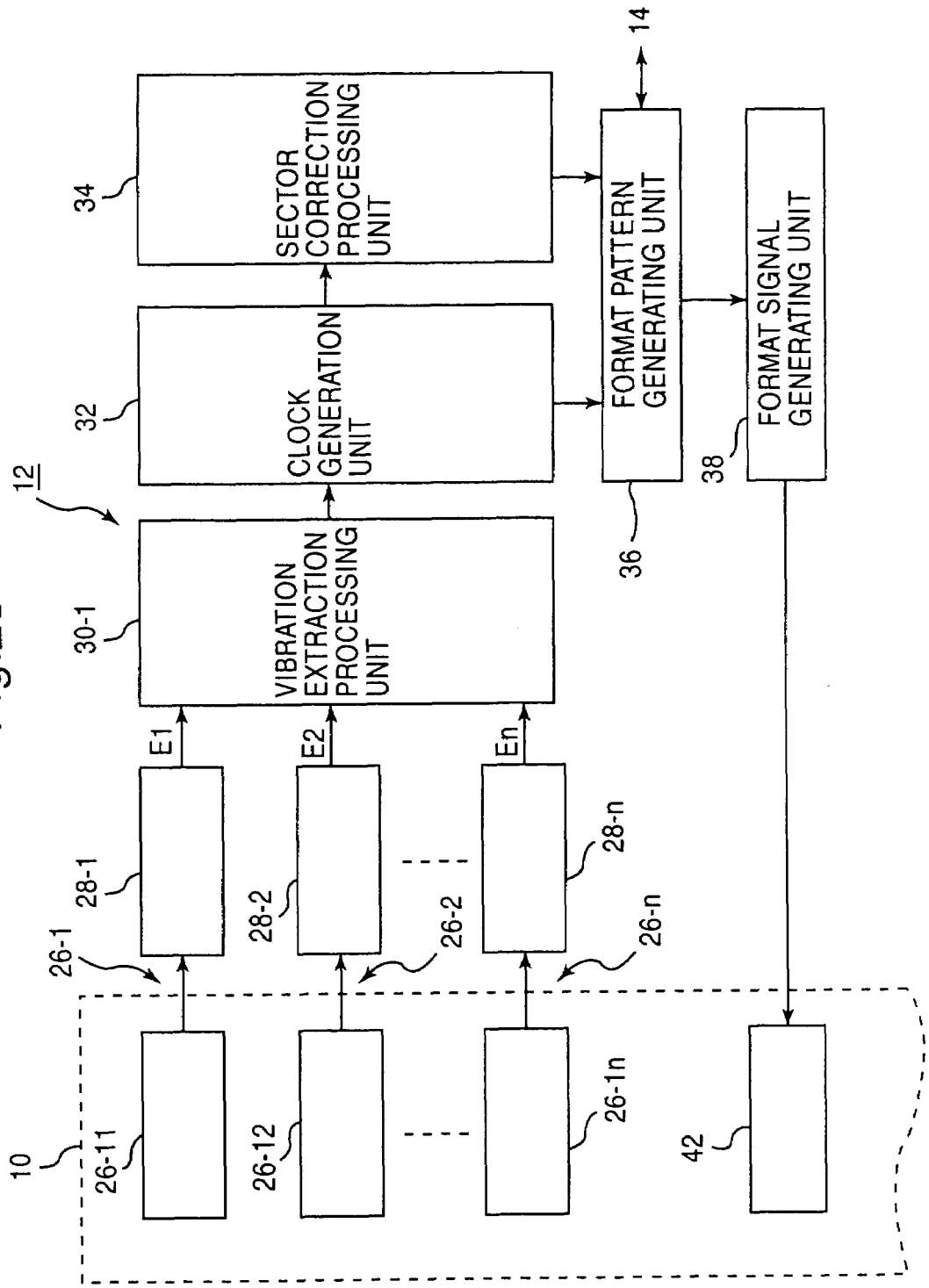
FIG. 23 is a block diagram of the embodiment of the servo clock writing device of the present invention using a plurality of non-contact sensors.

FIG. 23 shows a general embodiment of a case where n non-contact sensors 26-1 to 26-n are disposed and the embodiment shown in FIGS. 2, 3 indicates a case in which two non-contact sensors are disposed. If the plurality of non-contact sensors 26-1 to 26-n are disposed, the vibration extraction processing unit 30-1 extracts a vibration component from each sensor according to the fixed frequency signals E1-En and carries out averaging processing. Consequently, a high precision clock can be generated at a writing head position, that is, a high precision clock signal without a clock jitter can be generated there.

Figure 24:
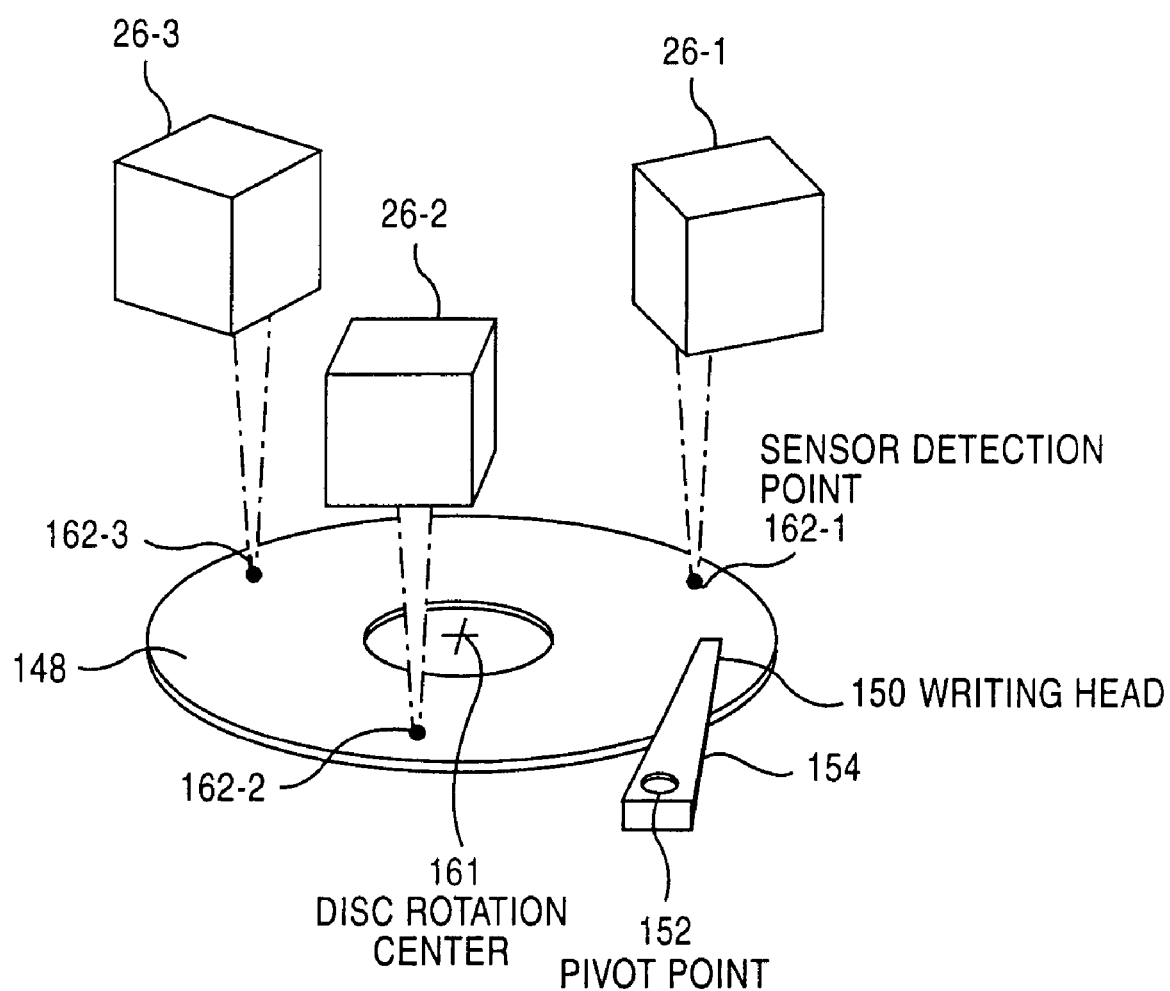
FIG. 24 is an explanatory diagram of the location of the sensors for extracting and correcting a vibration component by disposing three non-contact sensors.

FIG. 24 is a sensor allocation diagram for correcting the clock jitter based on extraction of vibration using three non-contact sensors 26-1 to 26-3 as a specific example of case where the plurality of non-contact sensors are employed of FIG. 23. In FIG. 24, a non-contact sensor 26-1 having a sensor detection point in the vicinity of the writing head 150 driven by the head arm 154 with respect to the pivot point 152 is fixed and disposed. A non-contact sensor 26-2 is disposed at a position of a sensor detection point 162-2 which is substantially 90° different and further, a non-contact sensor 26-3 is fixed and disposed at the position of a sensor detection point 162 on an opposite side relative to a disc rotation center 161, which is substantially 180° different. When the three non-contact sensors 26-1 to 26-3 are disposed with respect to a disc 148, of the clock jitters generated by a rotation deflection, their rotation jitter always coincides without depending on the positions of the sensor detection points 162-1 to 162-3. Contrary to this, for example, a jitter generated by disc translation motion due to an inclination of the spindle shaft produces a difference in detection radius, a difference in angle of detection direction and the like depending on the allocation of the sensor detection points 162-1 to 162-3. In case where for example n non-contact sensors are used, the clock generated by each sensor is expressed in the following equation.

$$T_i = T + \Delta T_R + \Delta T_{Pi} \quad i=1, \ldots, n \quad (3)$$

$\begin{cases} T_i: \text{clock generated from sensor } i \\ n: \text{quantity of sensors} \\ T: \text{basic cycle} \\ \Delta T_R: \text{rotation jitter} \\ \Delta T_{Pi}: \text{disc translation vibration jitter} \\ \quad \text{generated by each sensor} \end{cases}$ Then, the clock signal generated from the basic signal and each sensor signal is computed so as to extract the jitter component, which can be expressed in a following equation.

$$\Delta T_i = \Delta T_R + \Delta T_{Pi} \quad i=1, \ldots, n \quad (4)$$

$T_i$: clock jitter generated from sensor $i$

If a weight function considering the allocation condition of each non-contact sensor, namely the detecting radius, detecting direction and the like and the characteristic of the writing head is employed, the clock at a writing head position can be extracted. If the weight function $k_i(t)$ is specified so that $\Sigma\{k_i(t)\}=1$, the clock jitter at a writing head position is given as the following equation.

$$\Delta T_{Psrv} = \Sigma\{k_i(t) \cdot \Delta T_i\} \quad (5)$$
$$= \Delta T_R + \Sigma\{k_i(t) \cdot \Delta T_{Pi}\}(i=1, \ldots n)$$

$\begin{cases} \Delta T_{Psrv}: \text{clock jitter at a writing head position} \\ k_i(t): \text{weight function} \end{cases}$ Consequently, a high precision clock at a writing head position can be generated at any time.

Figure 25:
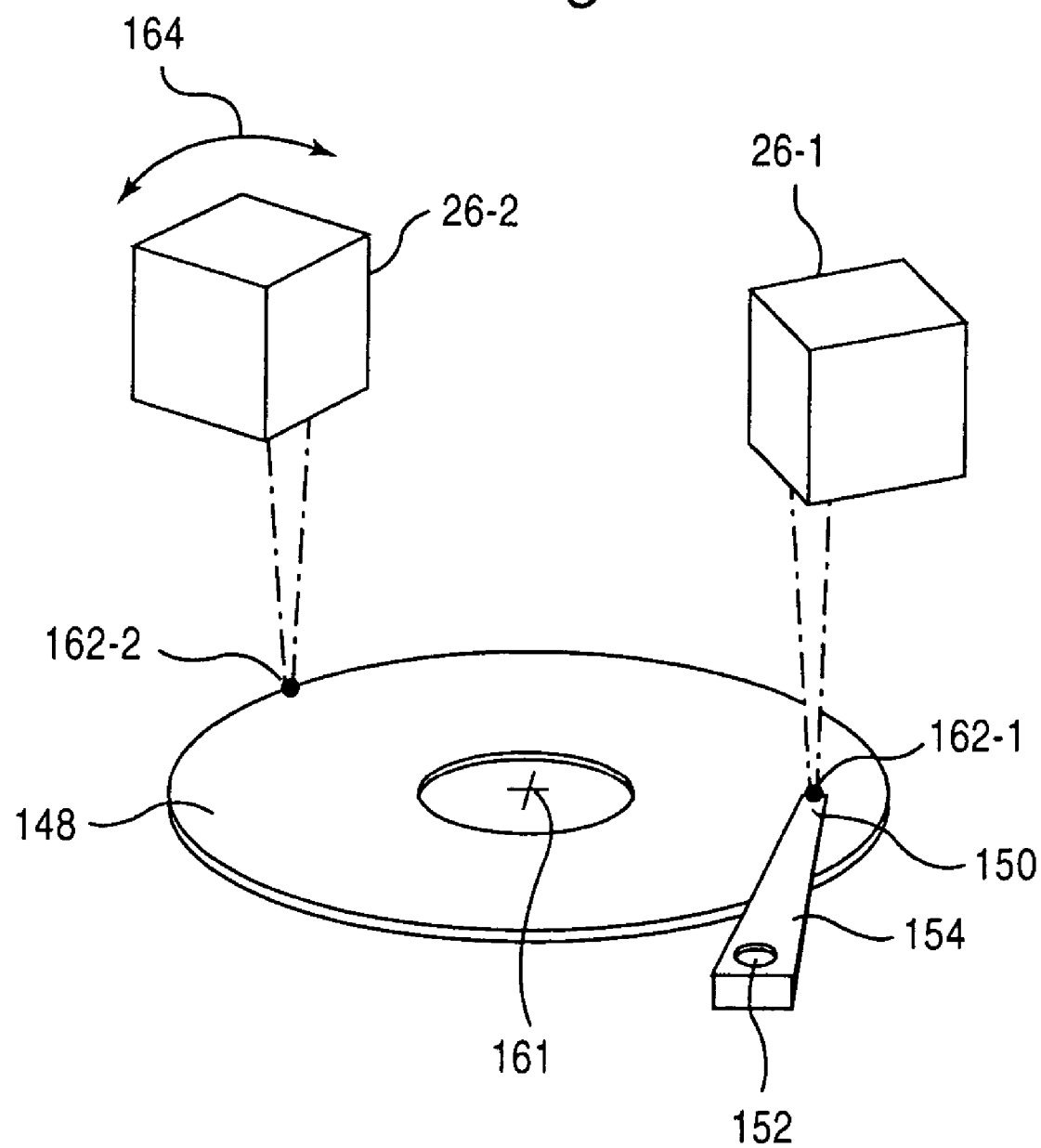
FIG. 25 is an explanatory diagram of the location of sensors for extracting and correcting a vibration component with one of two sensors fixed while the other being movable.

FIG. 25 shows a sensor allocation according to other embodiment about the vibration extraction processing of the present invention. Using a frequency change in sensor signals detected by the two non-contact sensors 26-1, 26-2, a jitter due to disc vibration at the head writing position is extracted and then, by correcting this, a high precision clock is generated. In FIG. 25, the non-contact sensor 26-1 is fixed to meet the sensor detection point 162-1 corresponding to the writing head 150. The non-contact sensor 26-2 is disposed such that its sensor detection point 162-2 is located on the same radius as the sensor detection point 162-1 and substantially on an opposite side relative to the disc rotation center 160. Further, the non-contact sensor 26-2 can be adjusted temporarily in the circumferential direction as indicated by an arrow 164 with respect to the disc rotation center 161.

Here, to extract a vibration component by using a frequency deflection from sensor signals of the non-contact sensors 26-1, 26-2, a signal V(t) is obtained by multiplying two sensor signals and its equation is expressed as follows.

$$V(t) = \sin(\omega + \Delta\omega_R + \Delta\omega_{PA})t \cdot \sin(\omega + \Delta\omega_R + \Delta\omega_{PB})t \quad (6)$$
$$= -1/2\{\cos(2\omega + 2\Delta\omega_R + \Delta\omega_{PA} + \Delta\omega_{PB})t - \cos(\Delta\omega_{PA} - \Delta\omega_{PB})t\}$$

$\begin{cases} V(t): \text{output signal of sensor} \\ \sin(\omega + \Delta\omega_R + \Delta\omega_{PA})t: \text{output signal of sensor } A \\ \sin(\omega + \Delta\omega_R + \Delta\omega_{PA})t: \text{output signal of sensor } B \\ \omega: \text{angular velocity} \\ \Delta\omega_R: \text{frequency deflection component by} \\ \quad \text{disc rotation} \\ \Delta\omega_{PA}, \Delta\omega_{PB}: \text{frequency deflection component by} \\ \quad \text{disc translation vibration detected by each} \\ \quad \text{sensor} \end{cases}$ This is the same relational expression as expressed in the embodiment of the vibration extraction processing unit 30 of FIG. 4. The first item of the right side of the above equation indicates a high frequency component and the second item indicates a low frequency component. Each item can be distinguished easily through a filter and the high frequency component of the first item is extracted as a jitter due to disc vibration or the like. Because the embodiment of FIG. 26 enables adjustment of the position of the non-contact sensor 26-2, the sum $(\Delta\omega_{PA} + \Delta\omega_{PB})$ of the frequency components by disc translation vibration detected by the non-contact sensors 26-1, 26-2 can be adjusted arbitrarily by this position adjustment. The embodiment of FIG. 4 presumes that the position of the non-contact sensor 26-2 is adjusted onto the same radius with respect to the disc rotation center 161.

Figure 26:
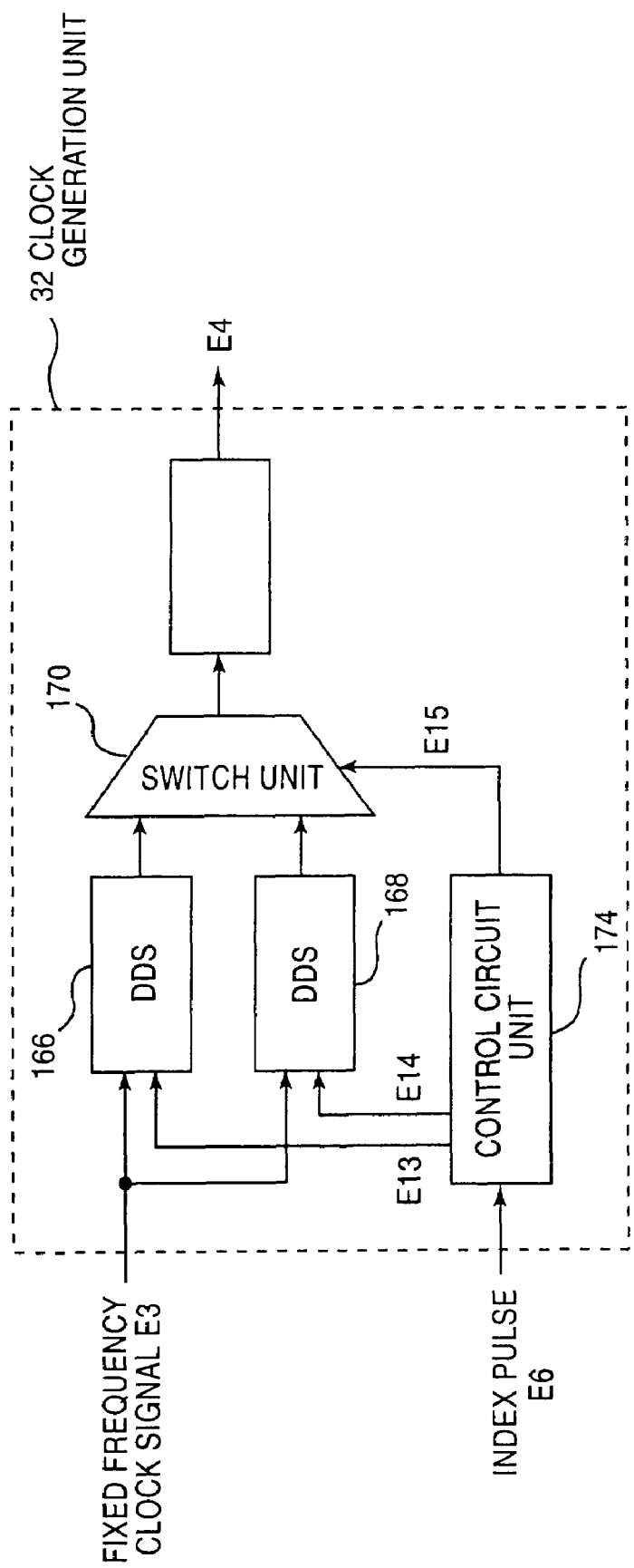
FIG. 26 is a block diagram of other embodiment of the clock generating unit of FIG. 2.

FIG. 26 is a block diagram of other embodiment of the clock generating unit 32 in FIG. 2. According to the embodiment of this clock generating unit 32, two DDSs 166, 168 are provided to correspond to a waveform change which is generated upon resetting of the DDS for abolishing a differential frequency between the format frequency indicated on a time chart of FIGS. 8A to 8E and the set frequency. Then, it is intended to eliminate an influence of the waveform change by switching these units.

Referring to FIG. 26, the clock generating unit 32 comprises DDS's 166, 168, a switching unit 170, a PPL circuit 172 and a control circuit unit 174. A fixed frequency clock signal E3 is input to the DDSs 166, 168 in parallel. Any one of the outputs of the DDS's 166, 168 is selected by the switching unit 170 and input to the PLL circuit 172. The control circuit unit 174 resets a side whose output is selected currently by the switching unit 170 of the DDS's 166, 168 synchronously with the index pulse E6. When the DDS 166 or DDS 168 is reset by the control circuit unit 174, the switching unit 170 switches so as to select a DDS opposite to the reset side. For example, if currently, the switching unit selects an output of the DDS 166, when the control circuit unit 174 resets the DDS 166 according to a reset signal E13 by receiving an index pulse E6, the switching unit 170 switches to the DDS 168 not reset according to a switching signal E15. In this way, the DDS's 166, 168 are reset alternately so as to abolish a differential frequency and by switching to the output of the DDS not reset, a disturbance in the output of the format frequency clock signal is prevented.

Figure 27:
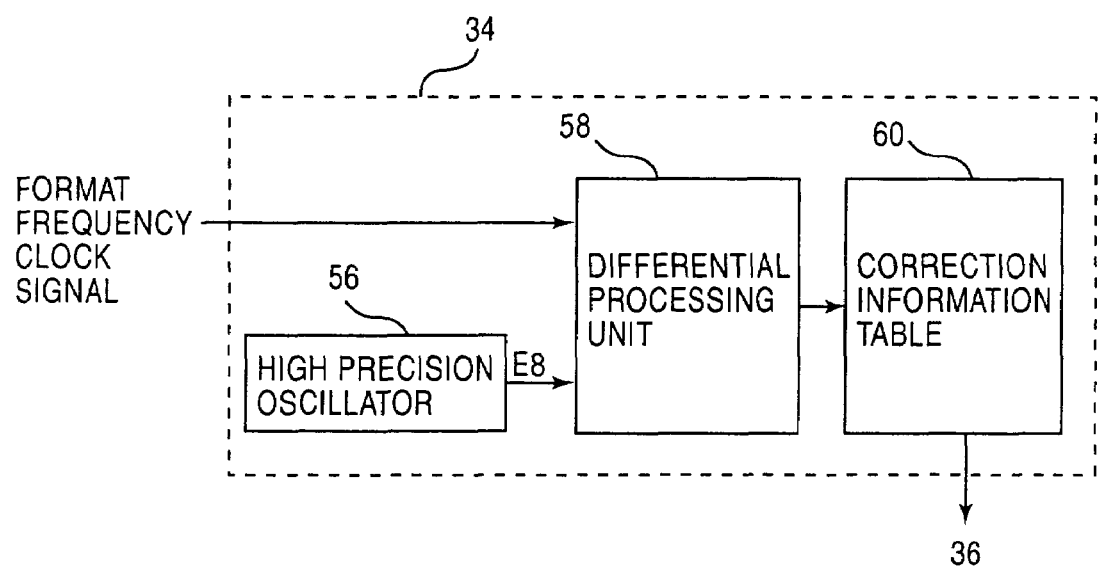
FIG. 27 is a block diagram of other embodiment of the sector correction processing unit of FIG. 2.

FIG. 27 shows other embodiment of the sector correction processing unit 34 in FIG. 3. According to the embodiment of this sector correction processing unit 34, the format frequency clock signal E4 is input to the differential processing unit 58 from the clock generating unit 32 on a preceding stage and compared with the high precision clock signal E8 from the high precision oscillator 56 so as to obtain an error at each sensor writing start position. This is stored in the correction information table 60 as a correction address amount so as to correct a format pattern memory. According to this embodiment, a reference signal is written into a disc actually and read out and compared with a high precision clock. Consequently, the processing can be carried out more easily than a case where a correction amount is detected.

Figure 28:
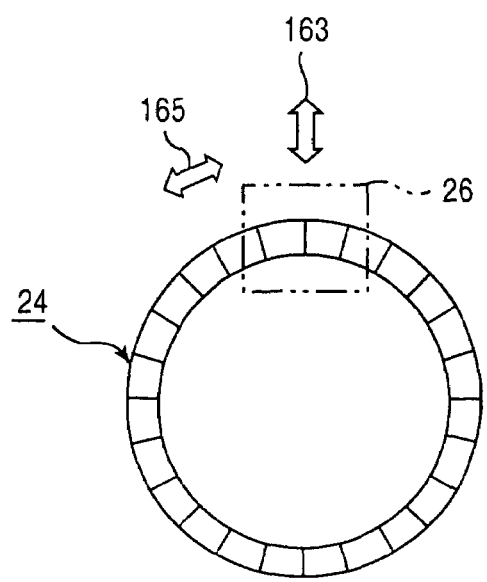
FIG. 28 is an explanatory diagram about the sensor moving direction with respect to a scale in the embodiment for correcting a clock by driving the non-contact sensors in a direction for canceling a vibration component by each other.

FIG. 28 shows other embodiment of removing the frequency deflection component synchronous with the disc rotation by driving the non-contact sensor directly and indicates a driving relation between the encoder scale 24 and the non-contact sensor 26. That is, the non-contact sensor 26 is disposed with respect to the encoder scale 24 provided on the disc side and the non-contact sensor 26 is provided so as to be movable freely in the radius direction and circumferential direction indicated by arrows. As for the driving of the non-contact sensor 26 in this case, the non-contact sensor 26 is moved in the circumferential direction for a deflection of the disc rotation speed so as to eliminate a relative motion due to a speed change. At the same time, the non-contact sensor 26 is driven following the motion of a disc in the radius direction thereby eliminating the motion in the radius direction.

Figure 29:
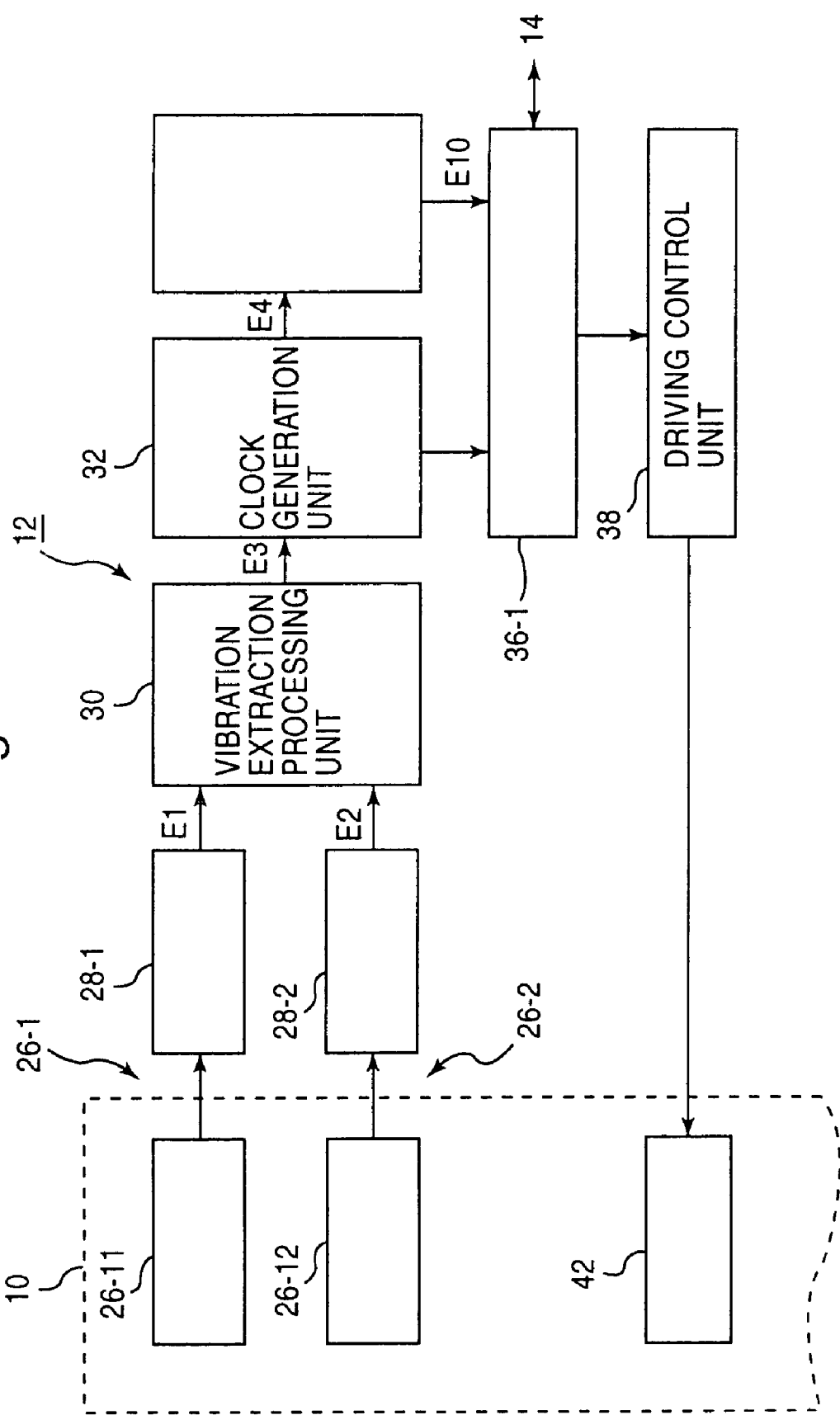
FIG. 29 is a block diagram of the embodiment of the present invention having a clock correcting unit for correcting a deflection component of a clock using a deflection signal from the PLL.

FIG. 29 shows other embodiment of the servo track writing device 12 of the present invention having a clock correcting unit 340 for correcting the frequency deflection component of a clock using a deflection signal of the PLL instead of the sector correcting unit 34 in FIG. 2. This clock correcting unit 340 has the structure shown in FIG. 30.

Figure 30:
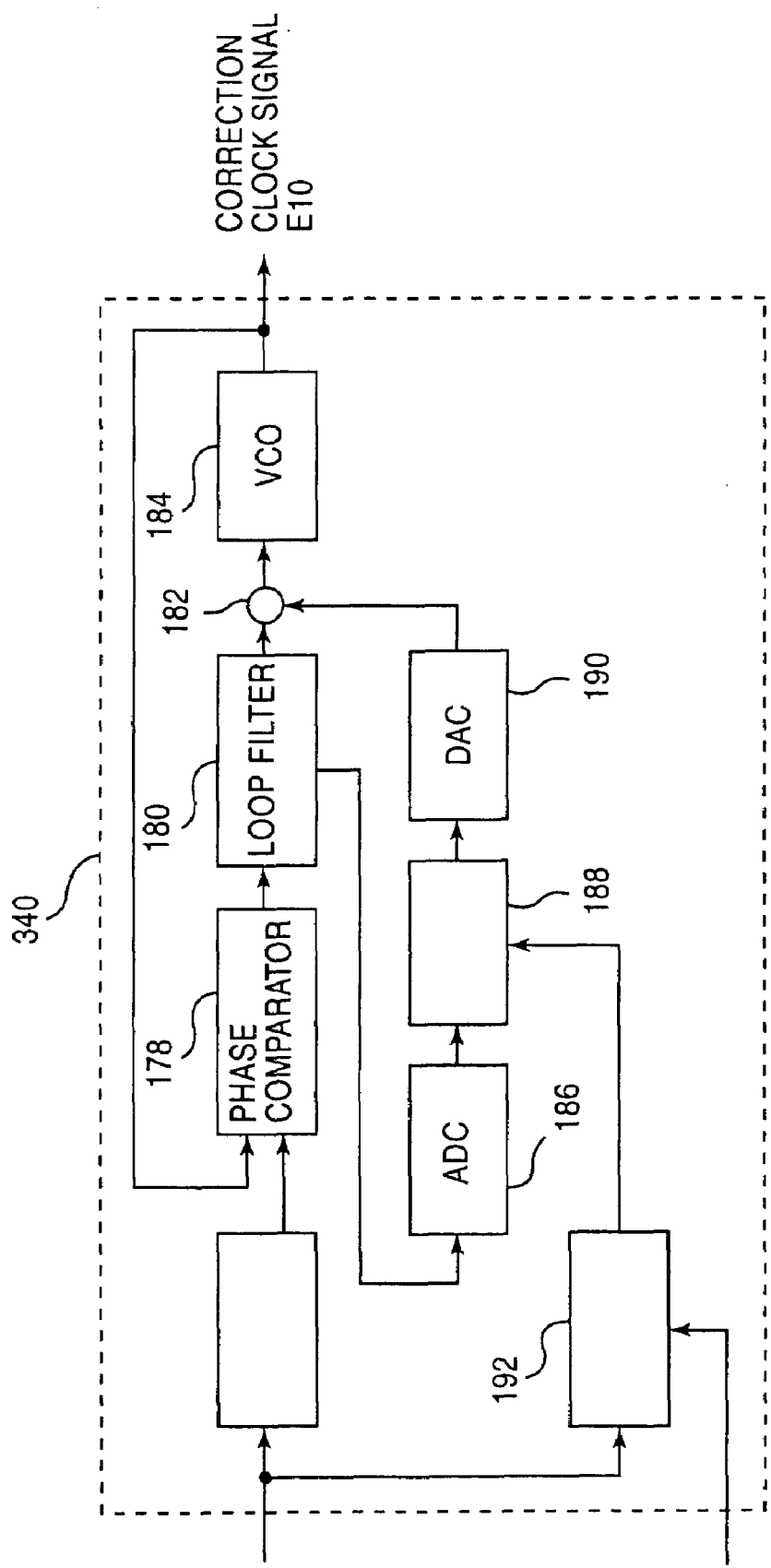
FIG. 30 is a block diagram of the embodiment of the clock correcting unit in FIG. 29.

Referring to FIG. 30, the clock correcting unit 340 includes a PLL circuit comprising a diver 176, a phase comparator 178, a loop filter 180 and a VCO 184. The PLL circuit further comprises an adder 182, an AD converter 186, a memory 188, a DA converter 190 and a counter. A format frequency clock signal E4 generated by the clock generating unit 32 on a preceding stage is input to the clock correcting unit 340 and the PLL circuit from the divider 176 to the VCO 184 carries out a control following a deflection of the clock. In this case, an instruction voltage from the loop filter 180 or the loop filter 180 at the writing start position of each sector corresponding to a single turn synchronous with the index pulse E6 is converted to digital data by an AD converter 186 and memorized. That is, the counter 192 is reset with the index pulse E6, a format frequency clock signal E4 is detected and a writing pulse is output from the counter 192 for the writing start position of each sector. An instruction voltage corresponding to a phase error from the loop filter 180 is converted to digital data by the D converter and memorized in the memory 188. Consequently, a clock deflection amount at the writing start position of each sector corresponding to a single turn is memorized in the memory 188 as a correction amount. After such measurement processing is completed, in the writing processing of a next format pattern, deflection correction data of each sector is read out successively by counter output indicating a sector writing position from the counter 192 synchronous with the index pulse E6 and returned to analog voltage by a DA converter 190. After that, the adder 182 controls oscillation frequency of the VCO 184 by removing the deflection component by subtracting form the output voltage of the loop filter 180. Consequently, a high precision correction clock signal E10 from which the frequency deflection synchronous with the rotation is removed can be output. Because the correction clock signal E10 from the clock correcting unit 340 is deprived of the deflection of the clock signal itself, if a format pattern written directly from the upper level device shown in FIG. 14 is read out for each sector and written into, a high precision writing position in the circumferential direction can be obtained. The correction by the clock correcting unit 340 in FIG. 30 is effective for correction of the frequency deflection synchronous with the rotation.

As described above, the present invention is capable of meeting various kinds of writing requests depending on the disc revolution number and the format pattern demanded for servo track writing by changing the frequency of a clock signal obtained from a detection signal from a non-contact sensor to any format frequency.

Further, because a vibration component is extracted from a detection signal from the non-contact sensor so as to correct a clock jitter, high precision positioning is achieved with the writing position in the circumferential direction being not affected by the clock jitter.

Further, a frequency deflection component synchronous with a rotation of a disc is detected, a deflection of the writing position in the circumferential direction due to a format frequency clock signal generated according to a detection signal from the non-contact sensor is removed so that a writing position is set up accurately in the circumferential direction even if there is a frequency synchronous with the rotation, thereby achieving writing of a physically high precision format pattern on the disc.

Because the frequency deflection synchronous with the disc rotation is detected and the detected deflection is corrected by shifting the writing start position on a format pattern detected from a upper level device according to a correction pulse number on a format pattern memory, the writing can be executed effectively using the corrected format pattern.

As another embodiment of the present invention, it is permissible to remove any one or both of the vibration extraction processing unit 30 and the sector correction processing unit 34 of the embodiment shown in FIG. 2. Further, the present invention includes appropriate modifications without departing from the object and advantage thereof. Further, the present invention is not restricted to the numerical values indicated in this specification.

What is claimed is:

1. A servo track writing device in which each track on a disc medium plane is divided into a plurality of sectors and a format pattern signal containing a servo frame signal is written into each sector, the servo track writing device comprising:
   at least two non-contact sensors which detect a clock pattern formed on a disc rotated at a constant speed by non-contact and outputs a clock signal of a predetermined frequency;
   a clock generating unit for generating a clock signal of arbitrary format frequency set up preliminarily based on a clock signal from the non-contact sensors;
   a writing processing unit for writing a format pattern signal into each track on the disc medium face according to a synchronous signal of a turn of the disc and the clock signal of the format frequency; and
   a sector correction processing unit which measures an error due to a frequency deflection synchronous with a rotation with respect to a preliminarily determined writing start position for each sector of the disc and corrects a writing start position of a format pattern signal for each sector including a servo frame signal stored in a memory according to the measured error.

2. The device according to claim 1 wherein the sector correction processing unit comprises:
   a writing/reading unit for writing a reference clock signal into a disc followed by reading;
   a high precision oscillator for oscillating a high precision clock signal having the same frequency as the reference clock signal; and
   a differential processing unit which measures a correction clock number indicating an error of the writing start position of each sector according to a differential between a reading clock signal output from the writing/reading unit and a high precision clock signal output from a high precision oscillator and holds.

3. The device according to claim 1 wherein the sector correction processing unit comprises:
   a high precision oscillator for oscillating a high precision clock signal having the same frequency as the reference clock signal; and
   a differential processing unit which measures a correction clock number indicating an error of the writing start position of each sector according to a differential between a clock signal output from the clock generating unit and a high precision clock signal output from a high precision oscillator.

4. The device according to claim 1 wherein the sector correction processing unit comprises a drive control unit for driving the non-contact sensor in the radius direction and in the circumferential direction so as to cancel the rotation deflection component of the disc.

5. The device according to claim 1 wherein the sector correction processing unit comprises a PLL circuit which generates a correction signal for the frequency deflection component synchronous with a disc rotation from a phase error signal in the PLL circuit so as to correct a clock signal of a format frequency.

6. The device according to claim 5 wherein the sector correction processing unit memorizes a phase error signal of a loop filter in the PLL circuit corresponding to a single turn in a memory synchronously with an index signal of a disc upon measurement, reads out the phase error signal memorized in the memory synchronously with the rotation of a disc upon correction and corrects the output signal of the loop filter.

7. A servo track writing device in which each track on a disc medium plane is divided into a plurality of sectors and a format pattern signal containing a servo frame signal is written into each sector, the servo track writing device comprising:
   at least two non-contact sensors which detect a clock pattern formed on a disc rotated at a constant speed by non-contact and outputs a clock signal of a predetermined frequency;
   a clock generating unit for generating a clock signal of arbitrary format frequency set up preliminarily based on a clock signal from the non-contact sensors;
   a writing processing unit for writing a format pattern signal into each track on the disc medium face according to a synchronous signal of a turn of the disc and the clock signal of the format frequency; and
   a vibration extraction processing unit for correcting a clock jitter by extracting a vibration component synchronous with a rotation from the clock signal of the non-contact sensors,
   wherein a plurality of the non-contact sensors are disposed around a disc and the vibration extraction processing unit extracts a vibration component synchronous with a rotation at the position of a writing head according to a clock signal from the plurality of non-contact sensors and outputs the corrected clock signal.

8. The device according to claim 7 wherein two non-contact sensors are disposed on the same radius with respect to a disc rotation center and the vibration extraction processing unit extracts and corrects a vibration component by using the frequency deflection of each clock signal output from the two non-contact sensors so as to generate a clock signal matching the position of a writing head.

9. The device according to claim 7 wherein two non-contact sensors are disposed on the same radius with respect to the disc rotation center and at symmetric positions with respect to the disc rotation center and the vibration extraction processing unit extracts and corrects a vibration component by using the frequency deflection of each clock signal output from the two non-contact sensors so as to generate a clock signal matching the position of a writing head.

10. The device according to claim 8 or 9 wherein the vibration extraction processing unit comprises:
    a multiplying unit for multiplying clock signals output from the two non-contact sensors;
    a high-pass filter for extracting a high pass component of output signal of the multiplying unit as a vibration component; and
    a correcting unit for correcting a clock signal output from the non-contact sensor nearer the writing head according to the signal extracted by the high-pass filter and outputting.

11. The device according to claim 7 wherein a plurality of non-contact sensors are disposed at different positions on the disc medium face for the writing head and the vibration extraction processing unit extracts a vibration component inherent of each position using a clock jitter from each clock signal of the plurality of non-contact sensors, obtains a vibration component at the writing head position by averaging or weighing the vibration components of the plurality of positions, and then corrects and outputs a clock signal from a specific non-contact sensor.

12. A servo track writing device in which each track on a disc medium plane is divided into a plurality of sectors and a format pattern signal containing a servo frame signal is written into each sector, the servo track writing device comprising:
- at least two non-contact sensors which detect a clock pattern formed on a disc rotated at a constant speed by non-contact and outputs a clock signal of a predetermined frequency;
- a clock generating unit for generating a clock signal of arbitrary format frequency set up preliminarily based on a clock signal from the non-contact sensors; and
- a writing processing unit for writing a format pattern signal into each track on the disc medium face according to a synchronous signal of a turn of the disc and the clock signal of the format frequency,
- wherein a plurality of sensor detection points are set up at different positions on a moving trajectory of the writing head relative to the disc, a non-contact sensor is disposed for each of the plurality of sensor detection points and a clock signal is output from a non-contact sensor nearer the writing head.

13. A servo track writing device in which each track on a disc medium plane is divided into a plurality of sectors and a format pattern signal containing a servo frame signal is written into each sector, the servo track writing device comprising:
- at least two non-contact sensors which detect a clock pattern formed on a disc rotated at a constant speed by non-contact and outputs a clock signal of a predetermined frequency;
- a clock generating unit for generating a clock signal of arbitrary format frequency set up preliminarily based on a clock signal from the non-contact sensors; and
- a writing processing unit for writing a format pattern signal into each track on the disc medium face according to a synchronous signal of a turn of the disc and the clock signal of the format frequency,
- wherein a sensor detection point of the non-contact sensor is moved along a moving trajectory of a writing head relative to the disc.

14. A servo track writing device in which each track on a disc medium plane is divided into a plurality of sectors and a format pattern signal containing a servo frame signal is written into each sector, the servo track writing device comprising:
- at least two non-contact sensors which detect a clock pattern formed on a disc rotated at a constant speed by non-contact and outputs a clock signal of a predetermined frequency;
- a clock generating unit for generating a clock signal of arbitrary format frequency set up preliminarily based on a clock signal from the non-contact sensors; and
- a writing processing unit for writing a format pattern signal into each track on the disc medium face according to a synchronous signal of a turn of the disc and the clock signal of the format frequency,
- wherein a detection point is located on a moving trajectory of a writing head on each of at least two faces of stacked medium assembly.

15. A servo track writing device in which each track on a disc medium plane is divided into a plurality of sectors and a format pattern signal containing a servo frame signal is written into each sector, the servo track writing device comprising:
- at least two non-contact sensors which detect a clock pattern formed on a disc rotated at a constant speed by non-contact and outputs a clock signal of a predetermined frequency;
- a clock generating unit for generating a clock signal of arbitrary format frequency set up preliminarily based on a clock signal output from the non-contact sensors; and
- a writing processing unit for writing a format pattern signal into each track on the disc medium face according to a synchronous signal of a turn of the disc and the clock signal of the format frequency,
- wherein the clock generating unit comprises:
  - a DDS (direct digital synthesizer) for dividing an input clock signal;
  - a PLL circuit for multiplying a clock signal from the DDS; and
  - a control circuit unit which resets the DDS with an index signal obtained every turn of the disc and while an output waveform is disturbed during and just after the resetting of the DDS, the clock waveform output by the PLL circuit is fed back and held.

16. The device according to claim 15, wherein the clock generating unit further comprises a PLL circuit which constitutes a primary multiplying circuit on an input stage of the DDS (direct digital synthesizer).

17. A servo track writing device in which each track on a disc medium plane is divided into a plurality of sectors and a format pattern signal containing a servo frame signal is written into each sector, the servo track writing device comprising:
- at least two non-contact sensors which detect a clock pattern formed on a disc rotated at a constant speed by non-contact and outputs a clock signal of a predetermined frequency;
- a clock generating unit for generating a clock signal of arbitrary format frequency set up preliminarily based on a clock signal output from the non-contact sensors; and
- a writing processing unit for writing a format pattern signal into each track on the disc medium face according to a synchronous signal of a turn of the disc and the clock signal of the format frequency,
- wherein the clock generating unit comprises:
- two DDSs (direct digital synthesizers) for dividing input clock signal in parallel;
- a switch circuit unit for switching outputs of the two DDSs;
- a PPL circuit for multiplying a clock signal from a DDS switched by the switching circuit unit; and
- a control circuit unit which resets the two DDSs alternately according to an index signal obtained every turn of a disc and while the output waveform is disturbed during and just after the resetting of the one DDS, switches the switch circuit unit to the other DDS and inputs a clock signal without disturbance of waveform into the PLL circuit.

18. The device according to claim 17, wherein the clock generating unit further comprises a PLL circuit which constitutes a primary multiplying circuit on an input stage of the DDS (direct digital synthesizer).

19. A servo track writing device in which each track on a disc medium plane is divided into a plurality of sectors and a format pattern signal containing a servo frame signal is written into each sector, the servo track writing device comprising:
- at least two non-contact sensors which detect a clock pattern formed on a disc rotated at a constant speed by non-contact and outputs a clock signal of a predetermined frequency;

a clock generating unit for generating a clock signal of arbitrary format frequency set up preliminarily based on a clock signal output from the non-contact sensors; and a writing processing unit for writing a format pattern signal into each track on the disc medium face according to a synchronous signal of a turn of the disc and the clock signal of the format frequency, wherein the clock generating unit further comprises a PLL circuit which constitutes a primary multiplying circuit on an input stage of the DDS (direct digital synthesizer).

20. A servo track writing device in which each track on a disc medium plane is divided into a plurality of sectors and a format pattern signal containing a servo frame signal is written into each sector, the servo track writing device comprising:

at least two non-contact sensors which detect a clock pattern formed on a disc rotated at a constant speed by non-contact and outputs a clock signal of a predetermined frequency;

a clock generating unit for generating a clock signal of arbitrary format frequency set up preliminarily based on a clock signal output from the non-contact sensors; and a writing processing unit for writing a format pattern signal into each track on he disc medium face according to a synchronous signal of a turn of the disc and the clock signal of the format frequency, wherein the disc is composed of a disc stack including a plurality of stacked discs to be written on mounted on the rotation shaft of a spindle shaft and a target disc in which a scale with the clock pattern is formed on the surface of one side of the disc stack fixed coaxially.

21. A servo track writing device in which each track on a disc medium plane is divided into a plurality of sectors and a format pattern signal containing a servo frame signal is written into each sector, the servo track writing device comprising:

at least two non-contact sensors which detect a clock pattern formed on a disc rotated at a constant speed by non-contact and outputs a clock signal of a predetermined frequency;

a clock generating unit for generating a clock signal of arbitrary format frequency set up preliminarily based on a clock signal output from the non-contact sensors; and a writing processing unit for writing a format pattern signal into each track on the disc medium face according to a synchronous signal of a turn of the disc and the clock signal of the format frequency, wherein the disc is a disc accommodated in an assembled air-tight enclosure, a scale with the clock pattern is mounted on the surface of a clamper on the accommodated disc and a sensor window is formed of a transparent member air-tight at a position allowing the scale to be seen from outside while the non-contact sensor is disposed outside.

22. A servo track writing method in which each track on a disc medium plane is divided to a plurality of sectors and a format pattern signal containing a servo frame signal is written into each sector, the servo track writing method comprising:

a clock detecting step for detecting a clock pattern formed on a disc rotated at a constant speed through a non-contact sensor and outputting;

a clock generating step for generating a clock signal of arbitrary format frequency set up preliminarily based on a clock signal of a predetermined frequency output from the non-contact sensor;

a writing processing step for writing a format pattern signal into the disc medium face according to a synchronous signal of a turn of the disc and the clock signal of the format frequency; and a sector correction step for measuring an error due to a frequency deflection synchronous with a rotation with respect to a preliminarily determined writing start position for each sector of the disc by means of a sector correction processing unit and correcting a writing start position of a format pattern signal for each sector including a servo frame signal stored in a memory according to the measured error.

23. A servo track writing method in which each track on a disc medium plane is divided to a plurality of sectors and a format pattern signal containing a servo frame signal is written into each sector, the servo track writing method comprising:

a clock detecting step for detecting a clock pattern formed on a disc rotated at a constant speed through a non-contact sensor and outputting;

a clock generating step for generating a clock signal of arbitrary format frequency set up preliminarily based on a clock signal of a predetermined frequency output from the non-contact sensor;

a writing processing step for writing a format pattern signal into the disc medium face according to a synchronous signal of a turn of the disc and the clock signal of the format frequency; and a vibration extraction step for correcting a clock jitter by extracting a vibration component synchronous with a rotation from the clock signal of the non-contact sensor, wherein the vibration extracting step is for extracting a deflection component synchronous with a rotation at a writing head position according to a clock signal from a plurality of non-contact sensors for the disc and outputs the corrected clock signal.

24. The method according to claim 23 wherein the vibration extracting step is for extracting and correcting a vibration component by using the frequency deflection of each clock signal output from two non-contact sensors disposed on the same radius with respect to a disc rotation center so as to generate a clock signal matching the position of a writing head.

25. The method according to claim 23 wherein the vibration extracting step is for extracting a vibration component using a frequency deflection between respective clock signals output from two non-contact sensors disposed on the same radius with respect to the disc rotation center and at symmetric positions with respect to the disc rotation center and correcting a clock jitter so as to generate a clock signal matching a writing head position.

26. The method according to claim 24 or 25 wherein the vibration extracting step comprises:

a multiplying step for multiplying clock signals output from the two non-contact sensors;

an extracting step for extracting a high pass component of output signal of the multiplying unit as a vibration component; and a correcting step for correcting a clock signal from the non-contact sensor nearer the writing head according to the signal extracted by the high-pass filter and outputting.

27. A servo track writing method in which each track on a disc medium plane is divided to a plurality of sectors and a format pattern signal containing a servo frame signal is written into each sector, the servo track writing method comprising:
a clock detecting step for detecting a clock pattern formed on a disc rotated at a constant speed through a non-contact sensor and outputting;
a clock generating step for generating a clock signal of arbitrary format frequency set up preliminarily based on a clock signal of a predetermined frequency output from the non-contact sensor;
a writing processing step for writing a format pattern signal into the disc medium face according to a synchronous signal of a turn of the disc and the clock signal of the format frequency; and
a vibration extraction step for correcting a clock jitter by extracting a vibration component synchronous with a rotation from the clock signal of the non-contact sensor,
wherein the vibration extracting step is for extracting a vibration component inherent of each position using a clock jitter from respective clock signals of the plurality of non-contact sensors disposed at different positions on a disc face with respect to the writing head position and a vibration component of the writing head position is obtained by averaging or weighing the vibration components of the plurality of positions so as to correct and output a clock signal from a specific non-contact sensor.

28. A servo track writing method in which each track on a disc medium plane is divided to a plurality of sectors and a format pattern signal containing a servo frame signal is written into each sector, the servo track writing method comprising:
a clock detecting step for detecting a clock pattern formed on a disc rotated at a constant speed through a non-contact sensor and outputting;
a clock generating step for generating a clock signal of arbitrary format frequency set up preliminarily based on a clock signal of a predetermined frequency output from the non-contact sensor; and
a writing processing step for writing a format pattern signal into the disc medium face according to a synchronous signal of a turn of the disc and the clock signal of the format frequency,
wherein a plurality of sensor detection points are set up at different positions on a moving trajectory of a writing head with respect to the disc, and a non-contact sensor is disposed for each of the plurality of sensor detection points so as to select a clock signal from a non-contact sensor near the writing head.

29. A servo track writing method in which each track on a disc medium plane is divided to a plurality of sectors and a format pattern signal containing a servo frame signal is written into each sector, the servo track writing method comprising:
a clock detecting step for detecting a clock pattern formed on a disc rotated at a constant speed through a non-contact sensor and outputting;
a clock generating step for generating a clock signal of arbitrary format frequency set up preliminarily based on a clock signal of a predetermined frequency output from the non-contact sensor; and
a writing processing step for writing a format pattern signal into the disc medium face according to a synchronous signal of a turn of the disc and the clock signal of the format frequency,
wherein a sensor detection point of the non-contact sensor is moved along a moving trajectory of a writing head relative to the disc.

30. A servo track writing method in which each track on a disc medium plane is divided to a plurality of sectors and a format pattern signal containing a servo frame signal is written into each sector, the servo track writing method comprising:
a clock detecting step for detecting a clock pattern formed on a disc rotated at a constant speed through a non-contact sensor and outputting;
a clock generating step for generating a clock signal of arbitrary format frequency set up preliminarily based on a clock signal of a predetermined frequency output from the non-contact sensor;
a writing processing step for writing a format pattern signal into the disc medium face according to a synchronous signal of a turn of the disc and the clock signal of the format frequency; and
a vibration extraction step for correcting a clock jitter by extracting a vibration component synchronous with a rotation from the clock signal of the non-contact sensor,
wherein the vibration extracting step is for locating a detection point on the moving trajectory of the writing head on each of at least two faces of stacked medium assembly.

31. A servo track writing method in which each track on a disc medium plane is divided to a plurality of sectors and a format pattern signal containing a servo frame signal is written into each sector, the servo track writing method comprising:
a clock detecting step for detecting a clock pattern formed on a disc rotated at a constant speed through a non-contact sensor and outputting;
a clock generating step for generating a clock signal of arbitrary format frequency set up preliminarily based on a clock signal of a predetermined frequency output from the non-contact sensor; and
a writing processing step for writing a format pattern signal into the disc medium face according to a synchronous signal of a turn of the disc and the clock signal of the format frequency,
wherein the clock generating step comprises:
a dividing step for dividing a clock signal input by a DDS (direct digital synthesizer);
a multiplying step for multiplying the clock signal from the DDS by a PLL circuit; and
a control step for resetting the DDS with an index signal obtained every turn of a disc and while an output waveform is disturbed during and just after the resetting of the DDS, feeding back and holding the clock waveform output by the PLL circuit.

32. A servo track writing method in which each track on a disc medium plane is divided to a plurality of sectors and a format pattern signal containing a servo frame signal is written into each sector, the servo track writing method comprising:
a clock detecting step for detecting a clock pattern formed on a disc rotated at a constant speed through a non-contact sensor and outputting;
a clock generating step for generating a clock signal of arbitrary format frequency set up preliminarily based on a clock signal of a predetermined frequency output from the non-contact sensor; and
a writing processing step for writing a format pattern signal into the disc medium face according to a synchronous signal of a turn of the disc and the clock signal of the format frequency, wherein the clock generating step comprises:

a dividing step for dividing input clock signal in parallel with two DDSs (direct digital synthesizers);

a switching step for switching outputs of the two DDSs;

a multiplying step for multiplying a clock signal from a DDS switched by the switching circuit unit by the PLL circuit; and a control step for resetting the two DDSs alternately according to an index signal obtained every turn of a disc and while the output waveform is disturbed during and just after the resetting of the one DDS, switching the switch circuit unit to the other DDS and inputting a clock signal without disturbance in waveform into the PLL circuit.

33. The method according to claim 31 or 32 wherein the clock generating step further comprises a step for executing primary multiplication on a preceding stage of the dividing step with the DDS.

34. A servo track writing method in which each track on a disc medium plane is divided to a plurality of sectors and a format pattern signal containing a servo frame signal is written into each sector, the servo track writing method comprising:

a clock detecting step for detecting a clock pattern formed on a disc rotated at a constant speed through a non-contact sensor and outputting;

a clock generating step for generating a clock signal of arbitrary format frequency set up preliminarily based on a clock signal of a predetermined frequency output from the non-contact sensor;

a writing processing step for writing a format pattern signal into the disc medium face according to a synchronous signal of a turn of the disc and the clock signal of the format frequency; and a vibration extraction step for correcting a clock jitter by extracting a vibration component synchronous with a rotation from the clock signal of the non-contact sensor, wherein the sector correction processing step comprises:

a writing/reading step for writing a reference clock signal into a disc and after that reading;

a high precision oscillating step for oscillating a high precision clock signal having the same frequency as the reference clock signal; and a differential processing step for measuring a correction clock number indicating an error of each sector according to a differential between a reading clock signal output in the writing/reading step and a high precision clock signal oscillated in the high precision oscillating step and holding.

35. A servo track writing method in which each track on a disc medium plane is divided to a plurality of sectors and a format pattern signal containing a servo frame signal is written into each sector, the servo track writing method comprising:

a clock detecting step for detecting a clock pattern formed on a disc rotated at a constant speed through a non-contact sensor and outputting;

a clock generating step for generating a clock signal of arbitrary format frequency set up preliminarily based on a clock signal of a predetermined frequency output from the non-contact sensor;

a writing processing step for writing a format pattern signal into the disc medium face according to a synchronous signal of a turn of the disc and the clock signal of the format frequency; and a vibration extraction step for correcting a clock jitter by extracting a vibration component synchronous with a rotation from the clock signal of the non-contact sensor, wherein the sector correction processing step comprises:

a high precision oscillating step for oscillating a high precision clock signal having the same frequency as the reference clock signal; and a differential processing step for measuring a correction clock number indicating an error of each sector according to a differential between a clock signal output in the clock generating step and a high precision clock signal oscillated in the high precision oscillating step.

36. A servo track writing method in which each track on a disc medium plane is divided to a plurality of sectors and a format pattern signal containing a servo frame signal is written into each sector, the servo track writing method comprising:

a clock detecting step for detecting a clock pattern formed on a disc rotated at a constant speed through a non-contact sensor and outputting;

a clock generating step for generating a clock signal of arbitrary format frequency set up preliminarily based on a clock signal of a predetermined frequency output from the non-contact sensor; a writing processing step for writing a format pattern signal into the disc medium face according to a synchronous signal of a turn of the disc and the clock signal of the format frequency;

a vibration extraction step for correcting a clock jitter by extracting a vibration component synchronous with a rotation from the clock signal of the non-contact sensor; and a sector correction step for measuring an error due to a frequency deflection synchronous with a rotation with respect to a preliminarily determined writing start position for each sector of the disc by means of a sector correction processing unit and correcting a writing start position of a format pattern signal for each sector including a servo frame signal stored in a memory according to the measured error, wherein the sector correcting step comprises a drive control step for driving the non-contact sensor in the radius direction and in the circumferential direction at the same time so as to kill the rotation deflection component of the disc.

37. The method according to claim 36 wherein the sector correcting step is for memorizing a phase error signal of a loop filter in a PLL circuit corresponding to a single turn in a memory synchronously with an index signal of a disc upon measurement, reading out the phase error signal memorized in the memory synchronously with the rotation of a disc upon correction and correcting the output signal of the loop filter.

38. A servo track writing method in which each track on a disc medium plane is divided to a plurality of sectors and a format pattern signal containing a servo frame signal is written into each sector, the servo track writing method comprising:

a clock detecting step for detecting a clock pattern formed on a disc rotated at a constant speed through a non-contact sensor and outputting;

a clock generating step for generating a clock signal of arbitrary format frequency set up preliminarily based on a clock signal of a predetermined frequency output from the non-contact sensor;

a writing processing step for writing a format pattern signal into the disc medium face according to a synchronous signal of a turn of the disc and the clock signal of the format frequency;

a vibration extraction step for correcting a clock jitter by extracting a vibration component synchronous with a rotation from the clock signal of the non-contact sensor; and a sector correction step for measuring an error due to a frequency deflection synchronous with a rotation with respect to a preliminarily determined writing start position for each sector of the disc by means of a sector correction processing unit and correcting a writing start position of a format pattern signal for each sector including a servo frame signal stored in a memory according to the measured error, wherein the sector correcting step is for generating a correction signal for the frequency deflection component synchronous with a disc rotation from a phase error signal in a PLL circuit so as to correct a fixed clock signal.

39. A servo track writing method in which each track on a disc medium plane is divided to a plurality of sectors and a format pattern signal containing a servo frame signal is written into each sector, the servo track writing method comprising:

a clock detecting step for detecting a clock pattern formed on a disc rotated at a constant speed through a non-contact sensor and outputting;

a clock generating step for generating a clock signal of arbitrary format frequency set up preliminarily based on a clock signal of a predetermined frequency output from the non-contact sensor; and a writing processing step for writing a format pattern signal into the disc medium face according to a synchronous signal of a turn of the disc and the clock signal of the format frequency, wherein the disc is composed of a disc stack including a plurality of stacked discs to be written on mounted on the rotation shaft of a spindle shaft and a target disc in which a scale with the clock pattern is formed on the surface of one side of the disc stack fixed coaxially.

40. A servo track writing method in which each track on a disc medium plane is divided to a plurality of sectors and a format pattern signal containing a servo frame signal is written into each sector, the servo track writing method comprising:

a clock detecting step for detecting a clock pattern formed on a disc rotated at a constant speed through a non-contact sensor and outputting;

a clock generating step for generating a clock signal of arbitrary format frequency set up preliminarily based on a clock signal of a predetermined frequency output from the non-contact sensor; and a writing processing step for writing a format pattern signal into the disc medium face according to a synchronous signal of a turn of the disc and the clock signal of the format frequency, wherein the disc is a disc accommodated air-tightly in an assembled disclosure, a scale with the clock pattern is mounted on the surface of a clamper on theccommodated disc and a sensor window is formed of a transparent member air-tightly at a position allowing the scale to be seen from outside while the non-contact sensor is disposed outside.

41. A servo track writing device in which each track on a disc medium plane is divided to a plurality of sectors and a format pattern signal containing a servo frame signal is written into each sector, the servo track writing device comprising:

non-contact sensors for detecting a clock pattern formed on a disc rotated at a constant speed through non-contact and outputting a clock signal;

a vibration extraction processing unit for extracting a deflection component synchronous with a rotation from a clock signal of the non-contact sensors so as to correct a clock jitter;

a clock generating unit for generating a fixed clock signal of an arbitrary format frequency preliminarily set up according to the clock signal output from the vibration extraction processing unit;

a sector correction processing unit which measures an error due to a frequency deflection synchronous with a rotation with respect to a preliminarily determined writing start position for each sector of the disc and corrects a writing start position of a format pattern signal for each sector including a servo frame signal stored in a memory according to the measured error; and a writing processing unit for reading out a corrected format pattern signal in the memory according to a synchronous signal of a turn of the disc and the clock signal of the format frequency and writing into each track of the disc medium face.

42. A servo track writing method in which each track on a disc medium plane is divided to a plurality of sectors and a format pattern signal containing a servo frame signal is written into each sector, the servo track writing method comprising:

a vibration extracting step for detecting a clock pattern formed on a disc rotated at a constant speed through non-contact, extracting a deflection component synchronous with a rotation from an output clock signal of a predetermined frequency and correcting a clock jitter;

a clock generating step for generating a clock signal of any format frequency preliminarily set up according to a clock signal from the vibration extracting step;

a sector correcting step for measuring an error due to a frequency deflection synchronous with a rotation with respect to a preliminarily determined writing start position for each sector of the disc and correcting a writing start position of a format pattern signal for each sector including a servo frame signal stored in a memory according to the measured error; and a writing step for reading out a corrected format pattern signal in the memory according to a synchronous signal of a turn of the disc and the clock signal of the format frequency and writing into each track of the disc medium face.

* * * * *